(12) United States Patent
Willis

(10) Patent No.: US 9,744,807 B2
(45) Date of Patent: Aug. 29, 2017

(54) WHEEL FLOAT WITH IMPROVED PIVOT JOINTS

(76) Inventor: Douglas G. Willis, Fresno, CA (US)

( * ) Notice: Subject to any disclaimer, the term of this patent is extended or adjusted under 35 U.S.C. 154(b) by 0 days.

(21) Appl. No.: 13/405,219

(22) Filed: Feb. 24, 2012

(65) Prior Publication Data

US 2017/0166006 A1    Jun. 15, 2017

Related U.S. Application Data

(63) Continuation-in-part of application No. 12/754,593, filed on Apr. 5, 2010.

(60) Provisional application No. 61/446,454, filed on Feb. 24, 2011.

(51) Int. Cl.
| | | |
|---|---|---|
| *B62B 3/00* | (2006.01) | |
| *B60B 33/04* | (2006.01) | |
| *B62B 5/00* | (2006.01) | |
| *B60B 33/00* | (2006.01) | |

(52) U.S. Cl.
CPC .......... *B60B 33/04* (2013.01); *B60B 33/0018* (2013.01); *B60B 33/0036* (2013.01); *B60B 33/0039* (2013.01); *B60B 33/0049* (2013.01); *B60B 33/0057* (2013.01); *B60B 33/0063* (2013.01); *B60B 33/0068* (2013.01); *B62B 5/0086* (2013.01)

(58) Field of Classification Search
CPC ................ B62B 3/00; B62B 3/02; B60B 3/04
See application file for complete search history.

(56) References Cited

U.S. PATENT DOCUMENTS

| | | | | |
|---|---|---|---|---|
| 5,507,069 A | * | 4/1996 | Willis | ..................... B60B 33/00 16/18 R |
| 7,146,683 B1 | * | 12/2006 | Willis | ................. B60B 33/0028 16/18 R |
| 7,500,285 B2 | * | 3/2009 | Willis | ................. B60B 33/0028 16/18 R |
| 7,506,405 B2 | * | 3/2009 | Willis | ................. B60B 33/0028 16/47 |

* cited by examiner

*Primary Examiner* — John Walters
*Assistant Examiner* — James Triggs
(74) *Attorney, Agent, or Firm* — Richard A. Ryan

(57) ABSTRACT

A wheel float that articulates in multiple directions for efficiently and safely moving an object across a surface having a non-planar obstruction. The wheel float has a pair of walking beam assemblies, a crosstube assembly having a crosstube interconnecting the walking beam assemblies, a pedestal supported by the crosstube and a center pivot assembly that allows the crosstube assembly to pivot relative to the pedestal. The pedestal has a support surface that supports the object above the walking beam assemblies. Each walking beam assembly has a base plate, wheeled casters, a pair of spaced apart hangers and a bushing assembly associated with an articulation opening in each of the hangers. Pivot members at the ends of the crosstube assembly engage the hanger bushings to allow the respective walking beam assembly to pivot relative to the crosstube. Thrust blocks or locating plates position the walking beam assemblies on the crosstube assembly.

20 Claims, 18 Drawing Sheets

WHEEL FLOAT WITH IMPROVED PIVOT JOINTS

REFERENCE TO RELATED APPLICATIONS

This patent application is a continuation-in-part of U.S. patent application Ser. No. 12/754,593 filed Apr. 5, 2010 and claims priority to U.S. Provisional Patent Application No. 61/446,454 filed Feb. 24, 2011 and International Patent Number PCT/US11/31131 filed Apr. 4, 2011.

STATEMENT REGARDING FEDERALLY SPONSORED RESEARCH

Not Applicable.

REFERENCE TO A SEQUENCE LISTING, A TABLE OR A COMPUTER PROGRAM LISTING APPENDIX SUBMITTED ON A COMPACT DISC

Not Applicable.

BACKGROUND OF THE INVENTION

A. Field of the Invention

The field of the present invention relates generally to wheel floats, carriages, casters and like apparatuses that are utilized to moveably support a load across a surface. In particular, the present invention relates to wheel floats that moveably and safely support a load across a surface having uneven or irregular areas. Even more particularly this invention relates to wheel floats having a pivot assembly that allows independent articulation of interconnected walking beam assemblies.

B. Background

Casters and carriage assemblies, typically comprising one or more casters, are generally well known and commonly utilized to assist in moving an object from one location to another across a surface. A conventional carriage assembly is attached to, integral with or otherwise configured to support a frame or the like having a support surface on which the object rests or is attached in a manner that allows the user to move the object with much less effort than would otherwise be required. Such carriage assemblies are utilized in numerous types of industry, in the home, in the medical field and, generally, anywhere it is either necessary or desirable to efficiently and safely move an object across a surface. For instance, airplane, automobile and other vehicle factories use carriage assemblies to move engines, frames, transmissions and other components from one part of the factory to another.

Although conventional carriage assemblies, as well as individual casters, tend to function well on smooth surfaces, they generally do not function very well on surfaces that are uneven and/or irregular. Even surfaces that appear to be planar will often, if not usually, have areas where the surface is not planar. For instance, many concrete or other hard, relatively smooth surfaces have one or more expansion joints, door jambs and tracks, markings and the like that must be passed over or crossed to transfer the object, moveably supported by the carriage assembly or caster, across the surface. In addition, conventional carriage assemblies and casters also tend to not function well on surfaces that have small obstructions, such as rocks, screws, bolts and such, on the surface in the path where a wheel of the carriage assembly or caster will traverse. Such objects are commonly found on factory and other floors. As well known, when a wheel of a carriage assembly or caster attempts to pass over an uneven or irregular area of the surface or a small object on the surface, the wheel tends to have difficulty. The difficulty of passing across such an area or over such obstructions is significantly compounded when the load is heavy. Such difficulty can substantially decrease the efficient operation of moving the object.

In addition to the loss of efficiency, the problems associated with moving a heavy object across a surface on a frame or the like supported above the surface by a conventional carriage assembly or caster include the risk of tipping due to the carriages/casters being inherently unstable on uneven and irregular surfaces and surfaces having small obstructions. The risk of tipping is substantially increased when changing directions and under other circumstances, including when the carriage/caster encounters something on the surface that tends to restrict travel in the selected direction. Generally, the instability results from the carriage/caster having a support post that is offset a distance away from the wheel axle. The load supported by the carriage/caster tends to bear down through the support post, which produces a tipping moment relative to the wheel axle. In addition, the angled vector of the weight of the object being moved tends to be higher than the wheel axle and, therefore, will drive the wheel down against the uneven or irregular surface or the obstruction on the surface, making it more difficult to traverse that area or obstruction.

Various carriage assemblies and casters have been devised which are better adapted to move an object, particularly a heavy object, across an uneven or irregular surface and over obstructions on the surface. One such prior art caster is set forth in U.S. Pat. No. 5,507,069, which issued to the inventor of the present invention. The above patent describes an articulated caster having a base assembly with three or more wheels attached thereto and extending radially from the center of the base and a pivot arm having a housing at a lower end that is received in a recessed area of the base. The upper end of the pivot arm connects to the apparatus using the caster. The pivot housing has a spherical chamber that contains a pivot ball. A pivot shaft passes through a pivot hole in the pivot ball, an angled slot in the housing and through a pair of pivot shaft holes provided in the opposing walls of the base recess area. The pivot holes are disposed as low as possible for improved stability. U.S. Pat. No. 7,146,683, U.S. Pat. No. 7,500,285 and U.S. Pat. No. 7,506,405, which also issued to the inventor of the present invention, describe articulated casters comprising a base assembly, at least three wheels pivotally attached to the base assembly, a pivot arm having an upper end configured to attach to an object to be moved and a universal joint at a lower end of the pivot arm that is attached to the base and configured for pivotal motion about two perpendicular axes. A brake assembly, attached to the pivot arm, forces a brake pad into frictional engagement with a surface to place the brake assembly in its engaged position. These patents also describe combining multiple casters together to form a compound carriage system to support larger and/or heavier loads without excessive elevation of such loads and describe a carriage system wherein the load is carried on a load supporting section of a frame between pairs of carriages.

One known disadvantage of prior art carriage assemblies and casters, including those described above, is that the components thereof require varying degrees of machining, welding and/or break bending to configure the carriage/caster for use with a frame to move an object across a surface. As is well known, such operations increase the cost of assembling the carriage/caster, both in materials and in labor, and result in structural weak points that can fail or otherwise reduce the useful life of the carriage/caster. In certain circumstances, the impact of these operations can significantly impact the cost and life of the carriage/caster. In addition to increasing the initial cost, the manner in which prior art carriages and casters are configured makes it difficult and relatively expensive to repair any parts that fail or replace any parts that have worn.

An improved articulating carriage that solves many of the problems identified above is set forth in U.S. patent application Ser. No. 12/754,593 (the "'593 application"), which inventors include the inventor of the present application and of which the present application is a continuation-in-part. The '593 application describes an articulating carriage that is specially configured to support an object so as to facilitate safe and efficient movement of the object across a surface area having one or more non-planar obstructions. As set forth therein, the walking beam pivotally supports a pedestal, which provides a support surface to support the object. The walking beam pivots relative to the pedestal as the object passes over the non-planar areas. The '593 application also describes an articulating carriage having a pair of walking beam assemblies connected by a crosstube that pivotally supports the pedestal.

While the above patents and the invention of the '593 application represent a substantial improvement over prior art casters, there is still a need for an improved wheel float for use to move objects across an uneven or irregular surface and across a surface having small obstructions in the path of the carriage. Specifically, what is needed is a wheel float that is more effective and efficient at moving an object, particularly heavy and/or large objects, across a surface which is uneven or irregular or which contains obstructions that could impede the movement of the carriage. The preferred wheel float should be configured such that it drives the wheels over any uneven or irregular areas and any obstructions, it is stable while going over such areas or obstructions and it is relatively close to the surface for ease of loading and unloading the object from a frame having the improved carriage. Preferably, the wheel float should be configured such that it can be assembled without machining, welding or break bending of any components to reduce the cost of such assembly and the need for expensive skilled labor. The preferred wheel float should be adaptable for use with a carriage system that can efficiently and safely move large and/or heavy objects across a surface.

SUMMARY OF THE INVENTION

The wheel float of the present invention provides the benefits and solves the problems disclosed above. That is to say, the present invention discloses an improved wheel float which effectively, efficiently and safely moves an object across a surface, including areas of the surface that are uneven or irregular or which have small obstructions thereon, by not being impeded by such areas or obstructions and being stable during use. The wheel float of the present invention has a low driving moment such that when a wheel hits an uneven or irregular area or an obstruction along the path of movement, the wheel is driven up over the area or obstruction so as not to impede movement of the object being moved by the wheel float or the carriage system of which the wheel float of the present invention is a component. When used with a carriage system, the wheel float of the present invention places the frame or other support apparatus of the carriage system to which it is attached and on which the object is carried close to the ground for ease of loading and unloading the object from the carriage system. In the preferred embodiment of the present invention, the wheel float can be assembled without requiring the end user to machine, weld or break bend any components of the carriage, thereby reducing the cost of such assembly and the need for expensive skilled labor. If desired, the wheel float of the present invention can be joined with like wheel floats to provide a carriage system that can efficiently and safely moves large and/or heavy objects across a surface, including surfaces that are uneven or irregular or which have small obstructions thereon.

In one general embodiment of the present invention, the improved wheel float generally comprises a first walking beam assembly, a second walking beam assembly, a crosstube assembly having a crosstube pivotally connecting to the two walking beam assemblies, a pedestal supported by the crosstube and a center pivot assembly that pivotally connects the pedestal to the crosstube. Each of the walking beam assemblies has a base plate, a first caster assembly at a first end of the walking beam assembly, a second caster assembly at a second end of the walking beam assembly and a pair of hangers supported by the base plate in spaced apart relation to each other. Each caster assembly has a wheel that is configured to rotate about a wheel center, rotatably engage the surface over which the wheel float is moved and support the base plate above the surface. Each of the hangers have an articulation opening disposed in corresponding relation to each other below the base plate. Each of the articulation openings have a bushing assembly, preferably comprising a replaceable bushing, disposed at a lower edge thereof. The crosstube assembly interconnects each of the articulation openings of the first walking beam assembly and the articulation openings of each of the second walking beam assembly. A first pivot member at or near a first end of the crosstube assembly defines a pivot engaging surface that engages the bushing assemblies of the first walking beam assembly to define a pivot point and allow articulation of the first walking beam assembly relative to the crosstube when one of the wheels of the first walking beam assembly contacts a non-planar area on the surface. A second pivot member at or near a second end of the crosstube assembly defines a pivot engaging surface that engages the bushing assemblies of the second walking beam assembly to define a pivot point and allow articulation of the second walking beam assembly relative to the crosstube when one of the wheels of the second walking beam assembly contacts a non-planar area on the surface. The pivot points are disposed below a horizontal plane through the wheel center of each of the wheels of the two walking beam assemblies to provide the desired low driving moment, which directs inertial forces up and over a non-planar area on the surface to greatly reduce mobile resistance that would otherwise result from the attempting to cross the non-planar area.

The pedestal is supported by the crosstube between the first walking beam assembly and the second walking beam assembly. The pedestal has a pair of spaced apart first support plates, a pair of spaced apart second support plates and a mounting plate interconnecting the support plates so as to dispose a support surface above the base plates of each of the first walking beam assembly and the second walking beam assembly in order to support the object above the walking beam assemblies. The center pivot assembly interconnects the pedestal and the crosstube in a manner that allows the crosstube to pivot relative to the pedestal when at least one of the wheels of the first walking beam assembly and the second walking beam assembly contacts a non-planar area on the surface.

In a preferred embodiment of the present invention, the wheel float is configured to be assembled without requiring the manufacturer, assembler or end user to machine, weld or break bend any components in order to assemble the wheel float. To accomplish this objective and to add strength to the walking beam assembly, the preferred embodiment of the wheel float utilizes a securing mechanism that comprises a clamping plate at each of the first and second ends of the walking beam assemblies to clamp outwardly extending tangs, which extend in opposite directions at the upper end of the hangers, to the base plate. Preferably, each of the outwardly extending tangs comprises one or more upwardly extending tabs configured to engage one or more cooperatively configured tab receiving openings in the clamping plate and comprises one or more downwardly extending tabs configured to engage one or more cooperatively configured tab receiving openings in the base plate. For added support, the preferred embodiment also includes at least one support rib disposed between the first hanger and the second hanger, with the support rib being engagedly supported by the base plate and clamped by the clamping plate. In the preferred embodiment, each of the pedestal support plates have one or more upwardly extending tabs that engage cooperatively configured tab receiving openings in the mounting plate. A pivot limiting means limits the pivotal movement of the walking beam assemblies to prevent damage to the wheel float. In a preferred configuration, the pivot limiting means comprises the forward and rearward edges of the articulation opening. The sides of the crosstube abut against these edges to limit the amount of articulation. Preferably, each of the bushing assemblies utilized in the wheel float comprises a replaceable bushing that is removably received in a bushing holder so it may be replaced when it wears out.

The articulating carriage of the present invention provides a high temperature tolerance for autoclave and like operations, such as are commonly utilized in the aerospace industry. In the preferred embodiment, the articulating carriage is tolerant of outdoor, dirty and/or corrosive environments. As such, the articulating carriage of the present invention is particularly useful for custom, temporary and/or military deployment applications, such as those where the carriage system may be left behind or disposed of at forward locations after a mission is accomplished rather than returned for further use. These and other benefits of the present invention will be readily understood and appreciated by those skilled in the art.

It is therefore the primary objective of the present invention to provide an improved wheel float that provides the advantages discussed above and overcomes the disadvantages and limitations which are associated with presently available wheel floats, articulating carriages, casters and the like. It is also an important objective of the present invention to provide a wheel float that effectively, efficiently and safely moves an object across a surface, including areas of the surface that are uneven or irregular or which have small obstructions thereon.

It is also an important objective of the present invention to provide a wheel float that is stable even when moving large or heavy objects and when changing direction.

It is also an important objective of the present invention to provide a wheel float that has a low driving moment to drive a wheel over an uneven or irregular area of a surface or a small obstruction on the surface in order to not impede movement of the object being moved.

It is also an important objective of the present invention to provide a wheel float that can be assembled by the end user without the need to machine, weld or break bend any components of the carriage so as to reduce the cost of such assembly and the need for highly skilled labor.

It is also an important objective of the present invention to provide an improved wheel float that generally comprises a pair of pivoting walking beam assemblies that are joined by a crosstube which includes a center pivot tube assembly that pivotally supports a pedestal that attaches to an object or to a frame for carrying the object so as to move the object across a surface in a manner that allows full articulation of the wheel float so as to facilitate moving the object across areas of a surface that are uneven or irregular or which have small obstructions thereon.

Another important objective of the present invention is to provide an improved wheel float that can be joined with like wheel floats to provide a carriage system which efficiently and safely moves large and/or heavy objects across a surface, including surfaces that are uneven or irregular or which have small obstructions thereon.

The above and other objectives of the present invention will become readily apparent and are explained in greater detail by reference to the attached figures and the description of the preferred embodiment which follows. As forth herein, the present invention resides in the novel features of form, construction, mode of operation and/or combination of processes presently described and understood by the claims.

BRIEF DESCRIPTION OF THE DRAWINGS

In the drawings which illustrate the preferred embodiments and the best modes presently contemplated for carrying out the present invention:

FIG. 10b is a front perspective view of the wheel float of FIG. 10a with the crosstube assembly and the walking beam assemblies being pivoted in opposite directions than that shown in FIG. 10a;

DETAILED DESCRIPTION OF THE PREFERRED EMBODIMENTS

With reference to the figures where like elements have been given like numerical designations to facilitate the reader's understanding of the present invention, the preferred embodiments of the present invention are set forth below. The enclosed description and drawings set forth and illustrate one or more of the preferred embodiments and, as such, represent one or more ways of configuring the present invention. Although specific components, materials, configurations and uses are illustrated, it should be understood that a number of variations to the components and to the configuration of those components described herein and in the accompanying figures can be made without changing the scope and function of the present invention. For instance, although the various figures and the description provided herein are directed to certain specific configurations of the wheel float and certain relationships between the components thereof, those skilled in the art will readily understand that this is set forth merely for purposes of simplifying the present disclosure and that the present invention is not so limited.

Figure 38:
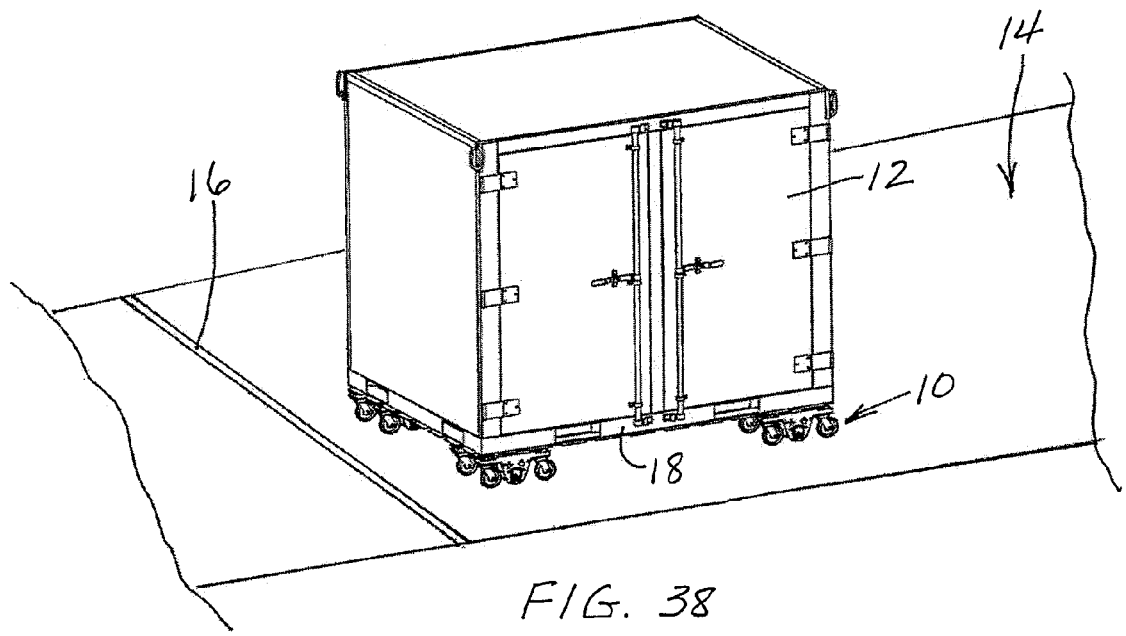
FIG. 38 is a side perspective view of a container supported by a frame being moved over a surface having a non-planar area by a plurality of wheel floats of the present invention.
Figure 39:
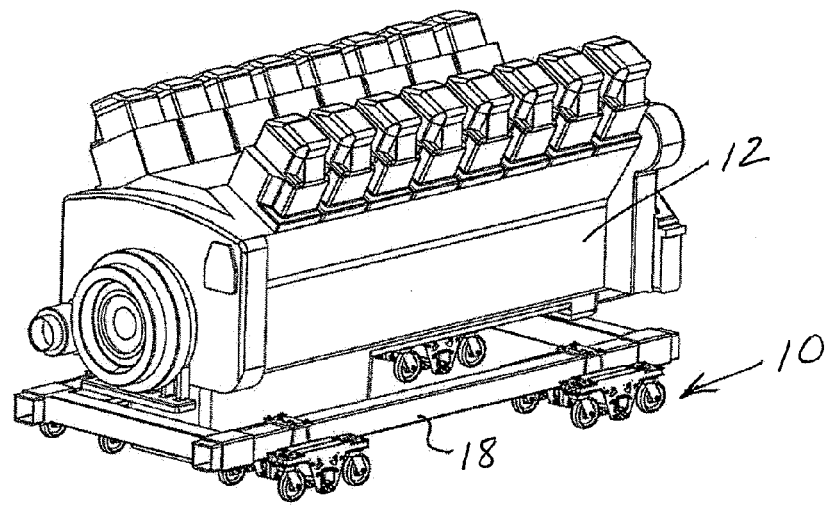
FIG. 39 is a side perspective view of an engine supported by a frame having a plurality of wheel floats of the present invention attached thereto.

A wheel float that is manufactured out of the components and configured pursuant to various embodiments of the present invention is shown generally as 10 in the figures. As shown in FIGS. 38 and 39, the components of which are explained in more detail below, one or more wheel floats 10 of the present invention can be utilized to move an object 12, such as the container in FIG. 38 or the engine in FIG. 39, across a surface 14, such as a floor or the like, that may have an uneven or irregular area or an obstruction, collectively referred to herein as non-planar area 16. Typically, the object 12 will be supported by or be attached to a support base 18, such as a frame or the like, that is supported above the surface 14 by a plurality of wheel floats 10. The wheel floats 10 are usually attached to the support base 18 to prevent the wheel float 10 from moving relative to (i.e., separating from) support base 18. As set forth in the Background, conventional carriages and casters have problems moving across a non-planar area 16, particularly when the object 12 is large and/or heavy, and are subject to undesirable tilting due to being generally unstable. The wheel float 10 of the present invention solves these problems.

The wheel float 10 of the present invention comprises many of the same components and is configured in much the same way as the articulating carriage described in the '593 application and in International Patent Application Number PCT/US11/31131 (the "'31131 application"). The full and complete specification, including the text and drawings, of the '593 application and the '31131 application are hereby incorporated herein by this reference as though fully set forth on the present specification. As exemplified by the embodiment shown in FIGS. 1 through 11, the wheel float 10 of the present invention generally comprises a pair of independently pivoting walking beam assemblies 20a and 20b, a crosstube assembly 138, comprising a crosstube 130, interconnecting the walking beam assemblies 20a/20b, a center pivot or center pivot assembly 140 and a pedestal 22 pivotally supported on crosstube 130 by center pivot assembly 140. As set forth in more detail below and shown in FIGS. 6-10, the wheel float 10 is configured to allow the walking beam assemblies 20a/20b and crosstube 130 to pivot relative to the pedestal 22 when a non-planar area 16 is encountered by the wheel float 10 as object 12 is moved across the surface 14. The pair of walking beam assemblies 20a/20b and the crosstube 130 operatively support the pedestal 22 and the other components above surface 14 as the wheel float 10 moves across the surface 14. In a preferred embodiment, pedestal 22 attaches to the support base 18 to moveably support the object 12 as it moves across the surface. Each of the walking beam assemblies 20a/20b has a pivoting means 24 associated therewith that allows the walking beam assemblies 20a/20b to independently pivot in a front-to-back direction when certain components of the wheel float 10 encounter the non-planar area 16 to allow the user to continue moving the object 12 across the surface 14 while maintaining the stability thereof to prevent any tipping or other negative, and potentially serious, occurrences. The center pivot assembly 140 associated with the crosstube 130 pivots the walking beam assemblies 20a/20b in a side-to-side direction. As will be readily appreciated by those skilled in the art, all or a portion of the weight of the object 12 is directed downward onto the pedestal 22 that is disposed generally laterally of and between the walking beam assemblies 20a/20b, then to the crosstube 130 that interconnects the walking beam assemblies 20a/20b and then through each of the walking beam assemblies 20a/20b to the surface 14.

Figure 12:
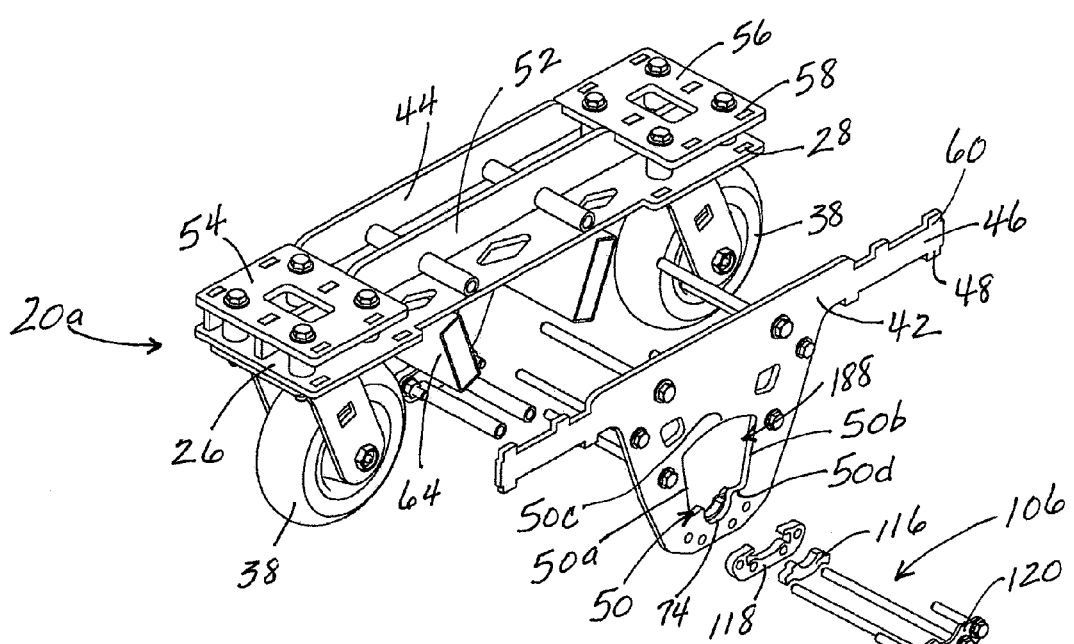
FIG. 12 is a partially exploded top perspective view of one of the walking beam assemblies of the wheel float of FIG. 1.

Each of the walking beam assemblies 20a/20b of wheel float 10 has a base plate 26 with a plurality of tab receiving openings 28 (as shown in FIG. 12) that, in a preferred embodiment, are disposed towards each of the first or leading end 30 and the second or trailing end 32 of the wheel float 10. The base plate 26 interconnects a first caster assembly 34 at the first end 30 of each of the walking beam assemblies 20a/20b and a second caster assembly 36 at the second end 32 of each of the walking beam assemblies 20a/20b. Each of the first 34 and second 36 caster assemblies comprise at least one wheel 38, a wheel bracket 40 and an axle connected to wheel bracket 40 around which the wheel 38 rolls as the wheel float 10 moves across surface 14. In a preferred embodiment, the wheels 38 utilized with the wheel float 10 are selected based on characteristics that are suitable for the intended use of wheel float 10. For instance, wheels 38 should be able to withstand heavy loading and move across surface 14 without damaging or marking the surface 14 (such as a floor). The wheels 38 should also have a low rolling resistance and a sufficiently high temperature tolerance for the intended use of wheel float 10. In addition, it is generally preferred that wheels 38 are relatively inexpensive. Nylon/fiberglass wheels 38 generally meet the desired characteristics and are utilized with one of the preferred embodiments of the wheel float 10. Other materials may also be found to be suitable for wheels 38. The wheel brackets 40 can be of the type that have a rigid, fixed position aligned with base plate 26 or can be of the type that swivel relative to the base plate 26, as well known in the art. In a preferred embodiment, the base plate 26 is elongated and the wheel 38 of first caster assembly 34 is generally linearly disposed relative to the wheel 38 of second caster assembly 36, as shown (for example) in FIGS. 1, 2 and 5.

Figure 1:
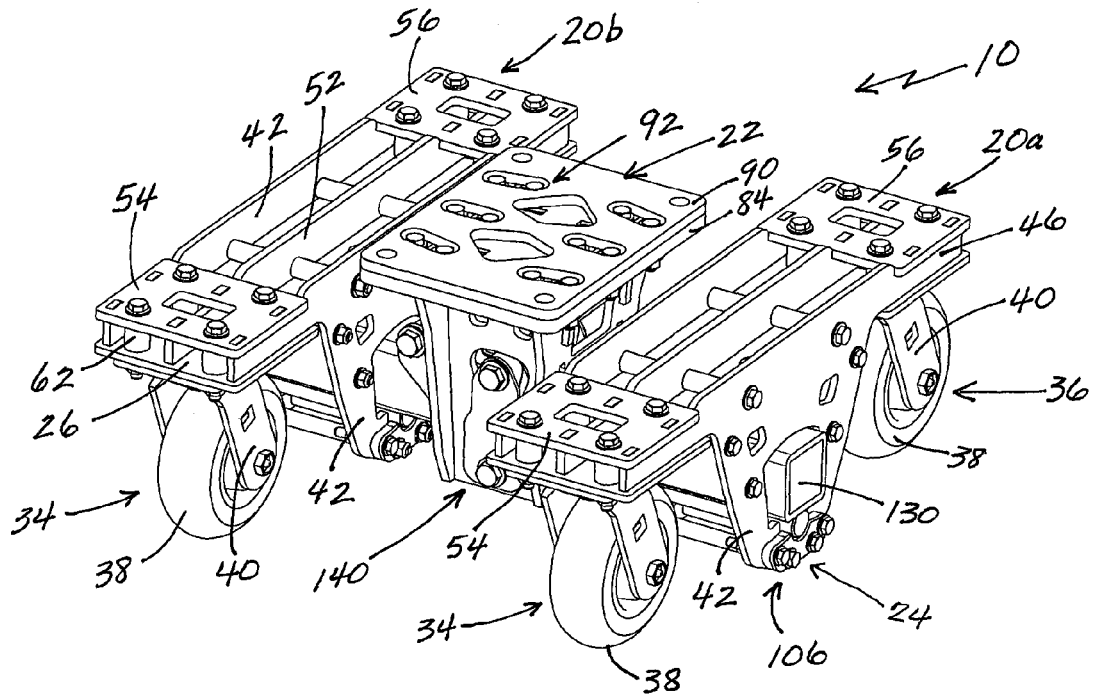
FIG. 1 is a top perspective view of a wheel float configured according to the principles and concepts of a first embodiment of the present invention showing a pedestal assembly disposed on a crosstube interconnecting a pair of spaced apart walking beam assemblies.
Figure 2:
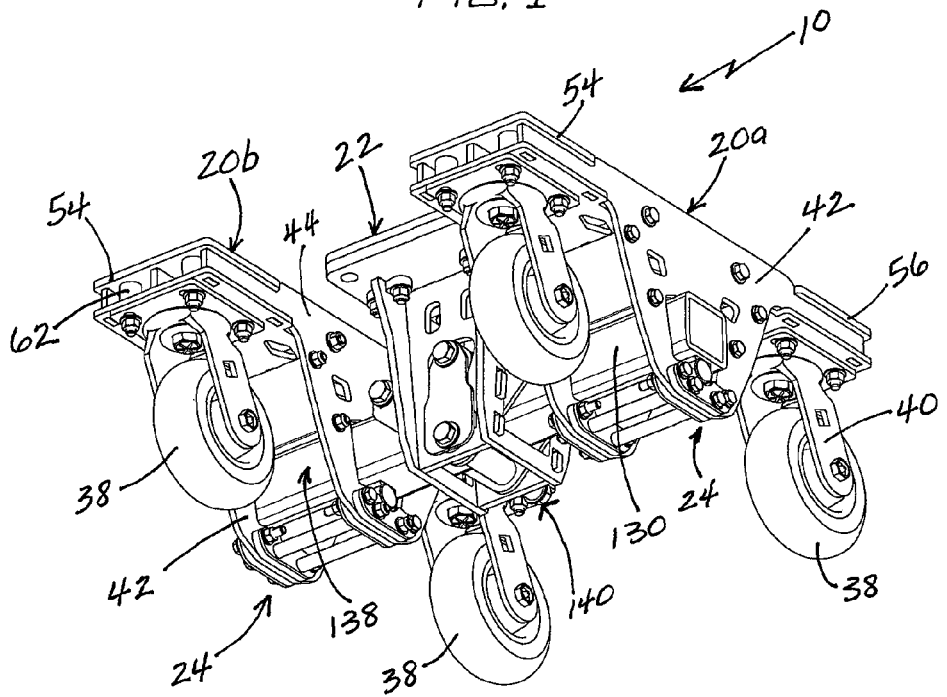
FIG. 2 is a bottom perspective view of the wheel float of FIG. 1.
Figure 3:
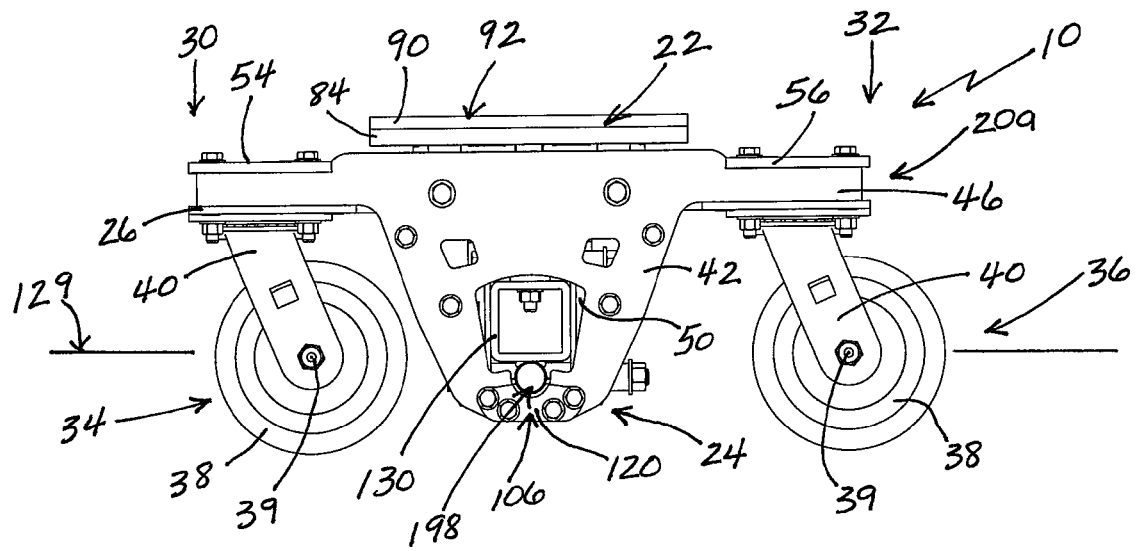
FIG. 3 is a right side view of the wheel float of FIG. 1.

Each walking beam assembly 20a/20b also has a first hanger 42 and a second hanger 44 positioned at opposite sides of the base plate 26. In one embodiment, the hangers 42/44 are fixedly secured to base plate 26, such as by welding, adhesives or the like, or are integral with base plate 26. In the preferred embodiment, however, the hangers 42/44 are engagedly supported by base plate 26. To accomplish this, each of the hangers 42/44 have outwardly extending tangs 46 that extend toward and are supported at the ends of the respective walking beam assembly 20a/20b, as best shown in FIGS. 1 through 3. A plurality of downwardly extending tabs 48 on the tangs 46 are received into the tab receiving openings 28 of the base plate 26, as best shown in FIG. 12, to assist in forming the walking beam assembly 20a/20b. As set forth in more detail below, each of the hangers 42/44 have one or more articulation openings 50, which are disposed towards the lower end of each of the hangers 42/44 below the base plate 26 that are sized and configured to receive an end of the crosstube 130 and facilitate the pivoting movement of the walking beam assemblies 20a/20b. If desired, each of the walking beam assemblies 20a/20b can also comprise one or more support ribs 52 disposed between the first 42 and second 44 hangers, as best shown in FIG. 1. The support rib 52 is utilized to provide additional structural support to walking beam assembly 20a/20b. As with the hangers 42/44, the support rib 52 has one or more downwardly extending tabs that engage cooperatively positioned tab receiving openings in the base plate 26.

One advantage of the configuration of the wheel float 10 of the present invention is that the orientation of the hangers 42/44 of the walking beam assemblies 20a/20b tends to keep the walking beam assemblies 20a/20b stable when, as applicable, the wheels 38 of the caster assemblies 34/36 swivel. As shown, hangers 42/44 are positioned outside the wheel center 39 of the wheels 38, even when the casters 34/36 swivel ninety degrees. Positioning the wheel centers 39 of wheels 38 between the hangers 42/44 provides a natural "cradle" effect that eliminates the normal tendency of the walking beam assemblies 20a/20b to rock sideways as the casters 34/36 swivel.

Figure 4:
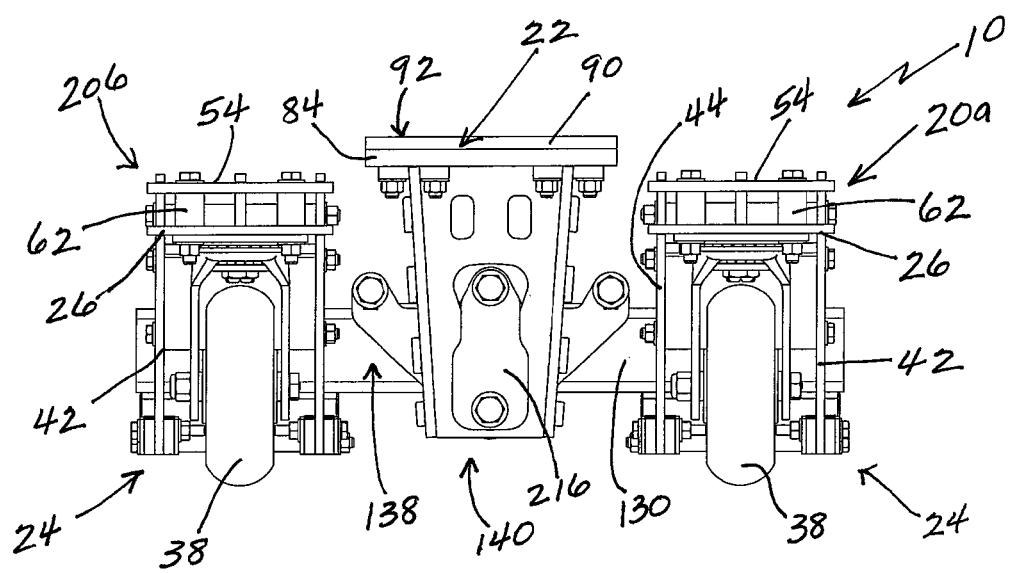
FIG. 4 is a front or leading view of the wheel float of FIG. 1.
Figure 5:
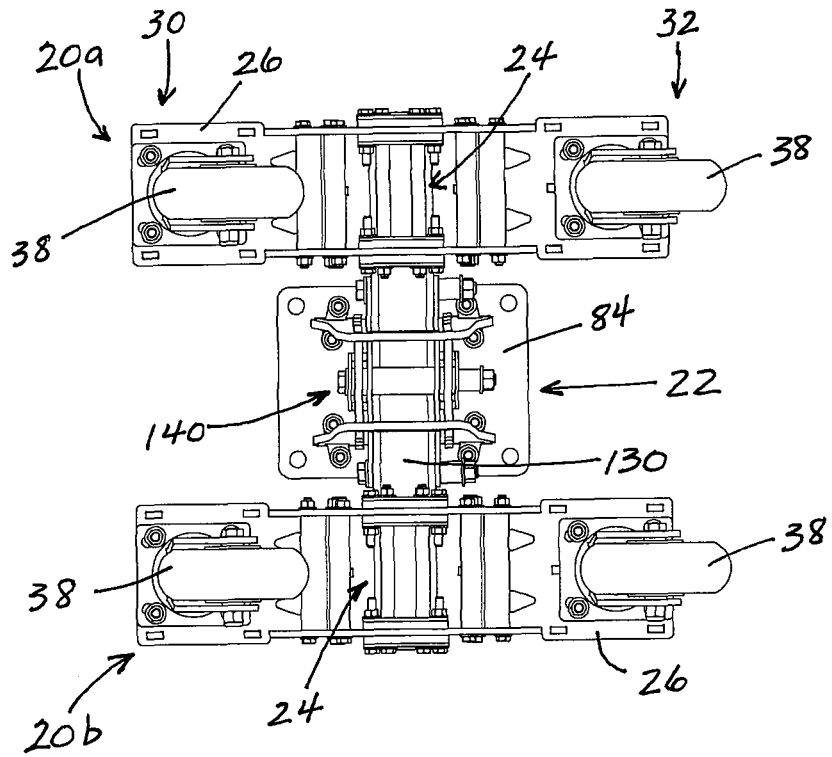
FIG. 5 is a bottom view of the wheel float of FIG. 1.

To secure the hangers 42/44 and support rib 52, if utilized, to the base plate 26, a securing means is utilized, preferably to engagedly support the hangers 42/44 and support rib 52 on base plate 26. In one embodiment of wheel float 10, the securing means is a clamping assembly comprising a first clamping plate 54 at the first end 30 and a second clamping plate 56 at the second end 32, as best shown in FIGS. 1 through 4. Clamping plates 54/56 have tab receiving openings 58, best shown in FIG. 12, that are sized and configured to receive the upward extending tabs 60 on the hangers 42/44 and support rib 52 to facilitate positioning the various components and to provide structural support for the walking beam assemblies 20a/20b. In a preferred configuration, clamping plates the 54/56 have apertures that are in corresponding relation to apertures on the base plate 26 and in the caster assemblies 34/36 such that a plurality of bolts can be utilized to clamp the hangers 42/44 and support rib 52 to the top surface of the base plate 26 and secure the caster assemblies 34/36 to the bottom surface of the base plate 26. The preferred embodiment also utilizes a plurality of clamping spacers 62, examples of which are shown in FIGS. 1, 2 and 4, between the clamping plates 54/56 and the base plate 26. A preferred embodiment of walking beam assembly 20a/20b comprises a pair of spacer tubes 64 below the base plate 26 that receive a bolt or other device to maintain the hangers 42/44 in spaced apart relation below the base plate 26, stabilize hangers 42/44 and provide additional structural support for the walking beam assemblies 20a/20b. The walking beam assemblies 20a/20b can also comprises rib spacer tubes below base plate 26 that each receive a bolt or other device therethrough. Each of the bolts preferably also pass through an aperture in a corresponding securing tab that extends downwardly from support rib 52. The bolts that pass through securing tabs also pass through apertures in the hangers 42/44, thereby more securely joining the support rib 52, base plate 26 and hangers 42/44. When all of the bolts are inserted through their respective apertures, spacers and other components, and engaged with a nut or other device at the threaded end, each of the walking beam assemblies 20a/20b are ready for use. No machining, welding or bending is required to form the walking beam assemblies 20a/20b, thereby allowing a relatively unskilled person to quickly and effectively form the walking beam assemblies 20a/20b for use with wheel float 10.

The pedestal 22 utilized with one embodiment of the wheel float 10 of the present invention connects the support base 18 which is supporting object 12, or to the object 12 itself, above the surface 14 to the center pivot assembly 140 to transfer the weight of the object 12 to the two walking beam assemblies 20a/20b and then to the surface 14 through the wheels 38. As shown in the figures, the pedestal 22 comprises a plurality of support plates 76, 77, 78 and 79 (best shown in FIGS. 14 and 15) that are connected together utilizing a plurality of outwardly extending tabs and cooperatively sized and positioned tab receiving openings. As also shown, pedestal 22 has a mounting plate 84 with a plurality of tab receiving openings 86 that are configured and cooperatively positioned to receive the upwardly extending tabs 88 at the upper ends of the support plates 76, 77, 78 and 79. Positioned above the mounting plate 84 is a spacer plate 90 having an upwardly facing support surface 92 that, in one embodiment, abuts the support base (i.e., frame) 18 or the object 12 and is attached thereto with one or more bolts. Spacer plate 90 "floats" above the mounting plate 84 between the support base 18 and mounting plate 84, with a plurality of upwardly extending members, such as bolt heads 180, are received in cooperatively positioned and sized member receiving slots 182 in the mounting plate 84 to interconnect the spacer plate 90 and mounting plate 84.

Figure 13:
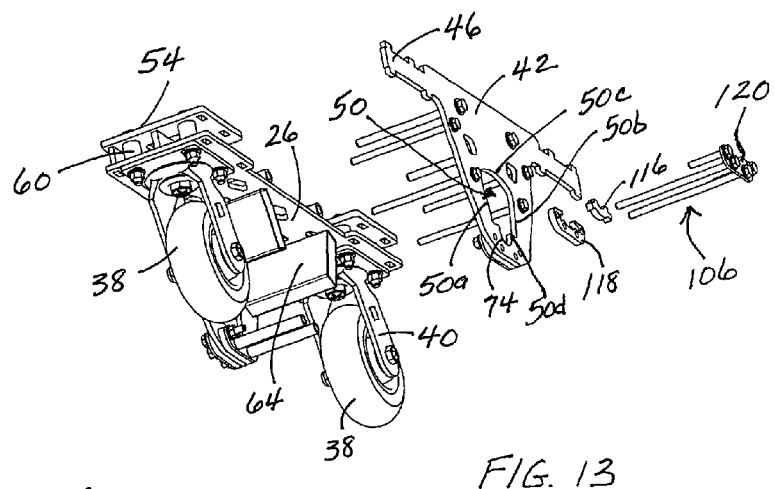
FIG. 13 is a bottom perspective view of the walking beam assembly of FIG. 12.

As stated above, pivoting means 24 of each walking beam assembly 20a/20b is configured to pivot the respective walking beam assembly 20a/20b in a generally front-to-back direction when the wheels 38 contact a non-planar area 16 in the surface 14 across which the object 12 is being moved with wheel float 10. In the embodiment of FIGS. 1 through 22, the pivoting means 24 utilized with the present invention comprises certain components of the crosstube assembly 138 (best shown in FIGS. 16-22) at the first end 184 and second end 186 of the crosstube assembly 138 that cooperatively engage a bushing assembly 106 at each of the first hanger 42 and the second hanger 44 of both the first walking beam assembly 20a and the second walking beam assembly 20b, as best shown in FIGS. 1 through 9. The components at the first end 184 of crosstube assembly 138 cooperatively engage the bushing assemblies 106 at the hangers 42/44 of the first walking beam assembly 20a and the components at the second end 186 of crosstube assembly 138 cooperatively engage the bushing assemblies 106 at the hangers 42/44 of the second walking beam assembly 20b. In a preferred embodiment, each bushing assembly 106 comprises a replaceable bushing 116, a bushing holder 118 and a bushing containment plate 120, as best shown in FIGS. 12 and 13. Preferably, bushing 116 is made out of bronze or like material. If desired, the multiple layers of bushing 116 and bushing holder 118 can be "stacked" between the hangers 42/44 and containment plate 120 depending on the load support requirements.

To achieve the desired pivoting of the hangers 42/44 in response to the wheels 38 of the walking beam assemblies 20a/20b contacting a non-planar area 16 of surface 14, the first 184 and second 186 ends of crosstube assembly 138 are sized and configured to extend into and through the articulation openings 50 of the hangers 42/44, as best shown in FIGS. 1-2 and 4-5. The ends 184/186 of the crosstube assembly 138 are configured to engage the upper edge 50c of the articulation openings 50 to contain the downward movement of the hangers 42/44 and, therefore, the sides of the walking beam assemblies 20a/20b when the wheel float 10 is lifted off of the floor or other surface 14. As the pedestal 22 remains stationary, carrying the object 12 (directly or indirectly), the walking beam assemblies 20a/20b are allowed to pivot, through the articulation of the hangers 42/44 relative to the ends 184/186 of crosstube assembly 138 that are disposed inside the articulation openings 50, in response to one or more of the wheels 38 contacting the non-planar area 16 of the surface 14 across which the object 12 is being moved. The hangers 42/44 pivot about the pivot bolt 70, explained in more detail below, at each end 184/186 of the crosstube assembly 138. To prevent damage to the various components of wheel float 10, the amount of pivoting by the walking beam assemblies 20a/20b is limited by a pivot limiting means 188. In the embodiment of wheel float 10 shown in the figures, the pivot limiting means 188 comprises the forward and rearward edges of the articulation openings 50, as best shown in FIGS. 12 and 13. As will be readily apparent to those skilled in the art, the pivoting movement of the hangers 42/44 will be limited by the forward edge 50a or the rearward edge 50b of articulation openings 50 making contact against the stationary crosstube 130 of the crosstube assembly 138. To achieve a desired amount of allowable pivoting, articulation openings 50 are cooperatively sized and shaped to receive the crosstube 130 through the articulation opening 50 and to allow the hangers 42/44 to pivot the desired amount.

Figure 16:
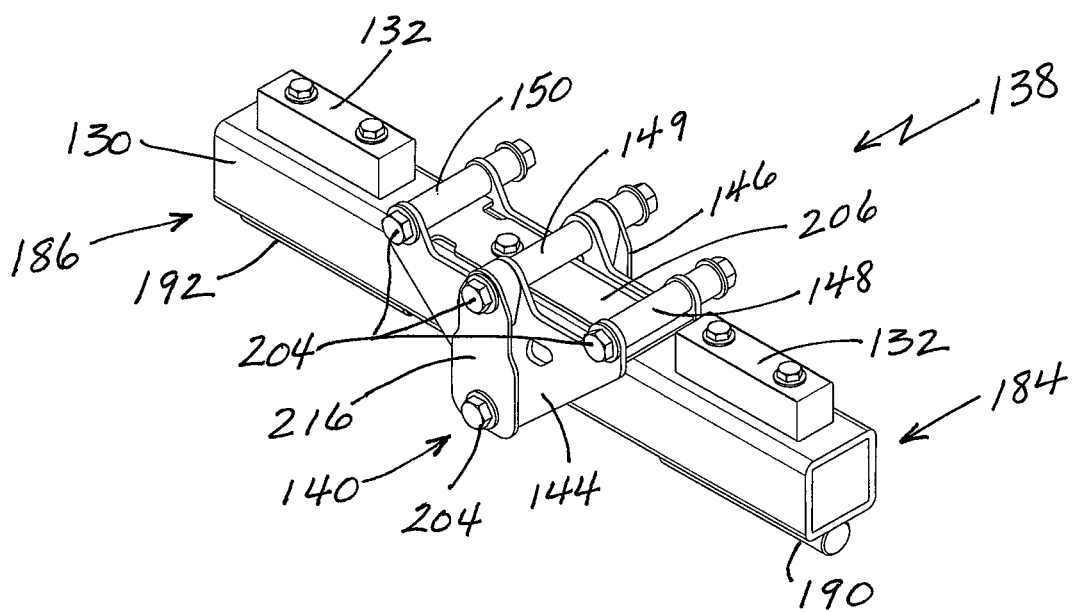
FIG. 16 is a top perspective view of the crosstube assembly and center pivot assembly of the wheel float of FIG. 1.
Figure 17:
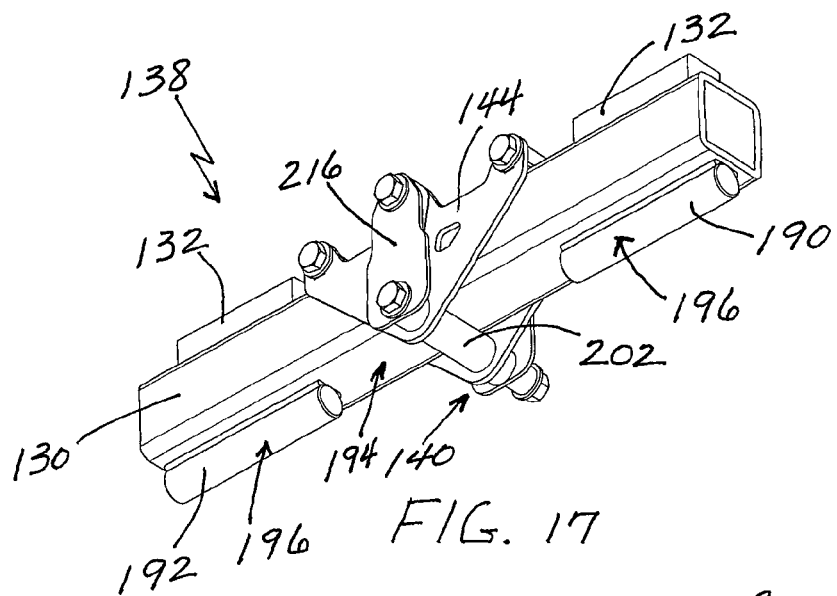
FIG. 17 is a bottom perspective view of the crosstube assembly and center pivot assembly of FIG. 16.
Figure 18:
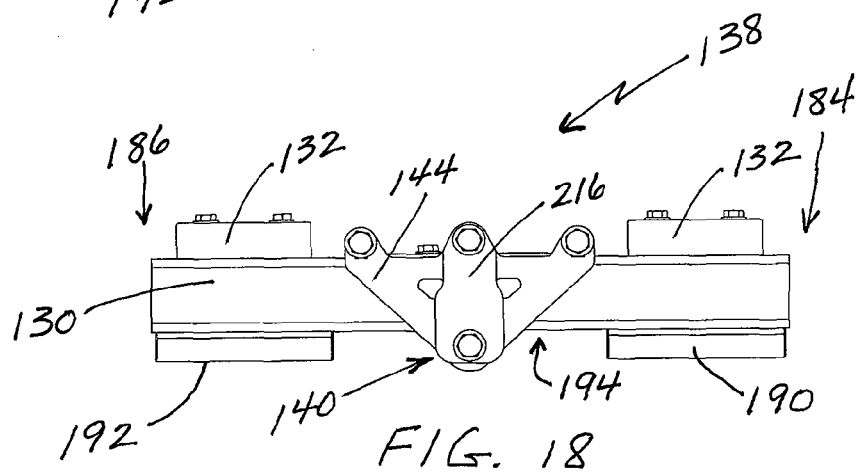
FIG. 18 is a front view of the crosstube assembly and center pivot assembly of FIG. 16.
Figure 19:
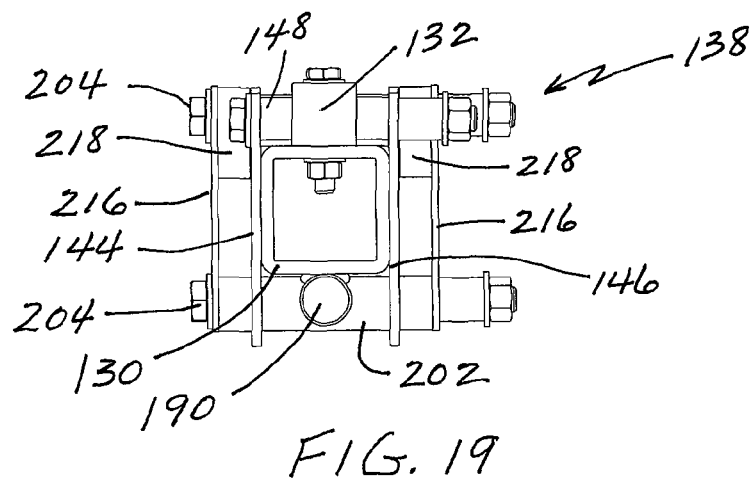
FIG. 19 is a right side view of the crosstube assembly and center pivot assembly of FIG. 16.
Figure 21:
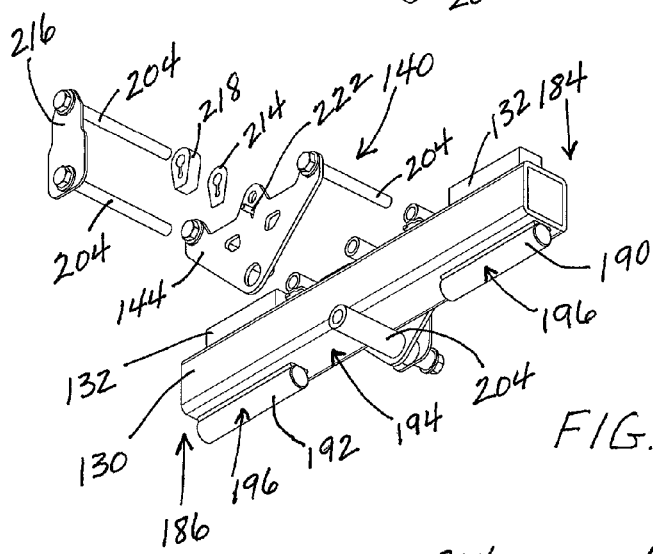
FIG. 21 is a bottom perspective view of the crosstube assembly and center pivot assembly of FIG. 20.

To facilitate pivoting of the walking beam assemblies 20a/20b relative to the crosstube assembly 138, which supports the pedestal 22 on which the weight or at least a portion of the weight of the object 12 is received, the crosstube assembly 138 comprises a first pivot member 190 at the first end 184 thereof and a second pivot member 192 at the second end thereof, as best shown in FIGS. 16-18 and 21. In the embodiment shown in these figures, the first 190 and second 192 pivot members are cylindrically-shaped members that are fixedly attached, such as by welding, adhesives or the like, to or integral with the lower surface 194 of crosstube 130 so as to extend generally downwardly therefrom. Each of the first 190 and second 192 pivot members define pivot engaging surfaces 196, as best shown in FIGS. 17 and 21, that engage the components of the bushing assemblies 106 associated with each of the hangers 42/44 of the walking beam assemblies 20a/20b. The pivot engaging surface 196 of each pivot member 190/192 engages the bushing 116 of the bushing assembly 106 to allow the hangers 42/44, and therefore the walking beam assemblies 20a/20b, to pivot when a wheel 38 contacts a non-planar area 16 on surface 14. The pivot point 198 of the walking beam assemblies 20a/20b is located at the intersection of the pivot engaging surfaces 196 and the bushing assembly 106 associated with each of the hangers 42/44. As shown in FIG. 3, the pivot point 198 is located below a plane 129 taken through the center 39 of the wheels 38, providing a very low position for the pivot point 198. The low driving moment that results from the positioning of the pivot point 198 directs inertial forces up and over a non-planar area 16 on the surface 14 to greatly reduce mobile resistance. In contrast, conventional casters direct the inertial forces generally down and into the non-planar area 16, which increases resistance to movement and makes it much more difficult for the user to move object 12 across non-planar area 16. As will be readily appreciated by those skilled in the art, instead of the cylindrical rod like shapes shown in the figures, the pivot members 190/192 can be provided in a variety of other shapes and configurations to achieve the desired pivoting of the walking beam assemblies 20a/20b in relation to crosstube assembly 138. In addition, the pivot engaging surfaces 196 of the pivot members 190/192 can be covered, or at least the relevant portion thereof, by a material that is specifically selected to wear better or pivot better than a base material used for the pivot members 190/192.

The crosstube assembly 138 of wheel float 10 also provides a thrust block 132 that is positioned between the first hanger 42 and the second hanger 44 of each of the walking beam assemblies 20a/20b. As best shown in FIGS. 16-18 and 20-21, a thrust block 132 is positioned at or near the first end 184 of the crosstube assembly 138 and another thrust block 132 is positioned at or near the second end 186 of the crosstube assembly 138 such that they will be properly located between the hangers 42/44 of the first walking beam assembly 20a and the second walking beam assembly 20b, respectively. In the embodiment shown in the figures, the thrust blocks 132 are generally rectangular pieces of metal that are bolted to the upper surface 200 of the crosstube 130, as best shown in FIG. 16. The length each of the thrust blocks 132 is selected so as to tightly fit between the hangers 42/44 of the walking beam assemblies 20a/20b when the wheel float 10 is assembled. The thrust blocks 132 positions the hangers 42/44 on crosstube 130, which provides the proper position for the other components of the walking beam assemblies 20a/20b that abut, attach to or are clamped to the hangers 42/44, as described above. In addition, the thrust block 132 keeps the walking beam assemblies 20a/20b from coming off of crosstube 130. As will be readily appreciated by those skilled in the art, the thrust blocks 132 can be provided in a wide variety of different sizes and configurations and be attached to, including fixedly attached to by welding or the like, or integral with the upper surface 200 of the crosstube 130.

Figure 6:
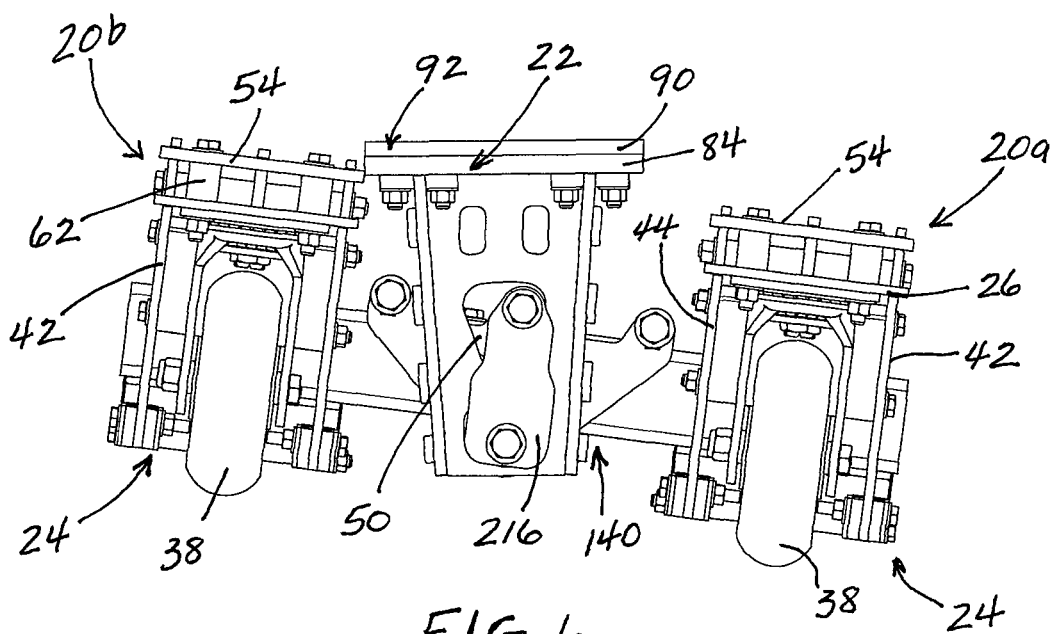
FIG. 6 is a front view of the wheel float of FIG. 1 showing left/right side articulation of the crosstube assembly within the pedestal assembly.
Figure 7:
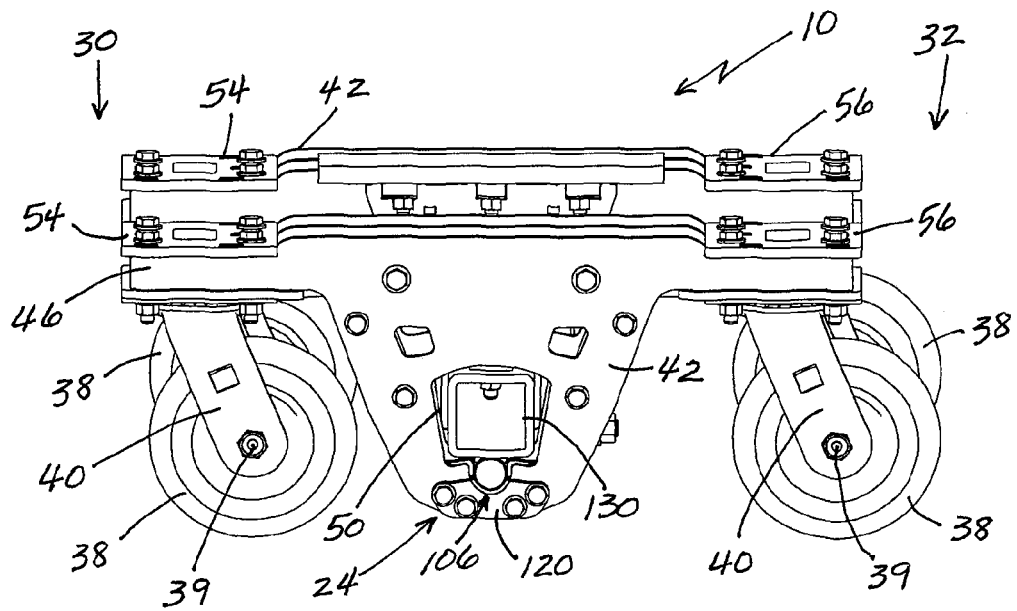
FIG. 7 is side perspective view of the wheel float of FIG. 6.
Figure 8:
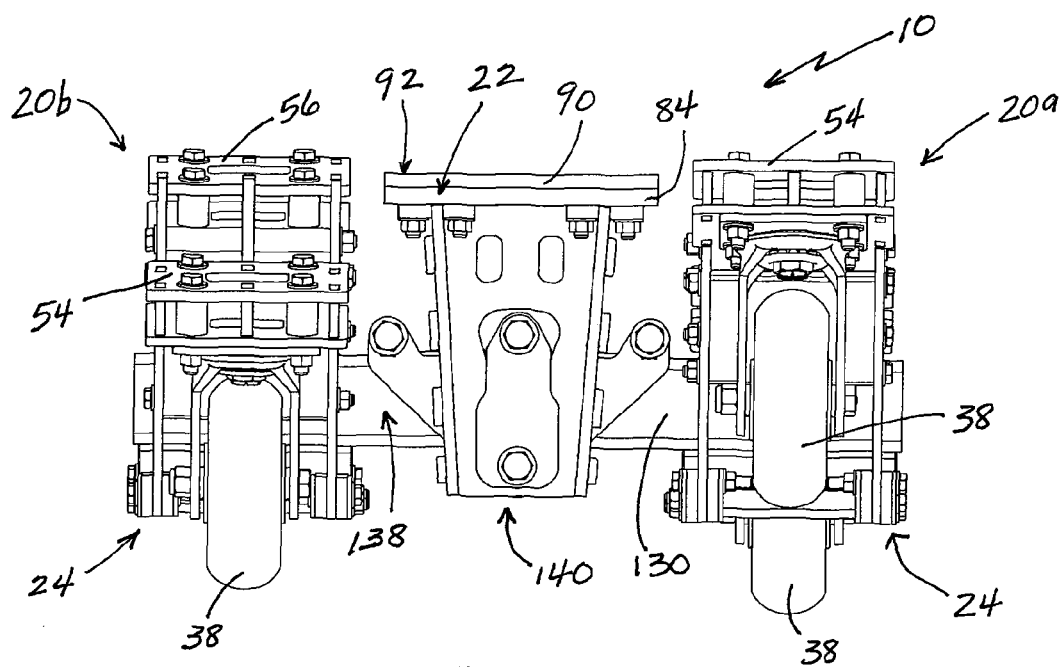
FIG. 8 is a front view of the wheel float of FIG. 1 showing front/back articulation of the walking beam assemblies, with the walking beam assemblies being shown articulated in opposite directions.
Figure 9:
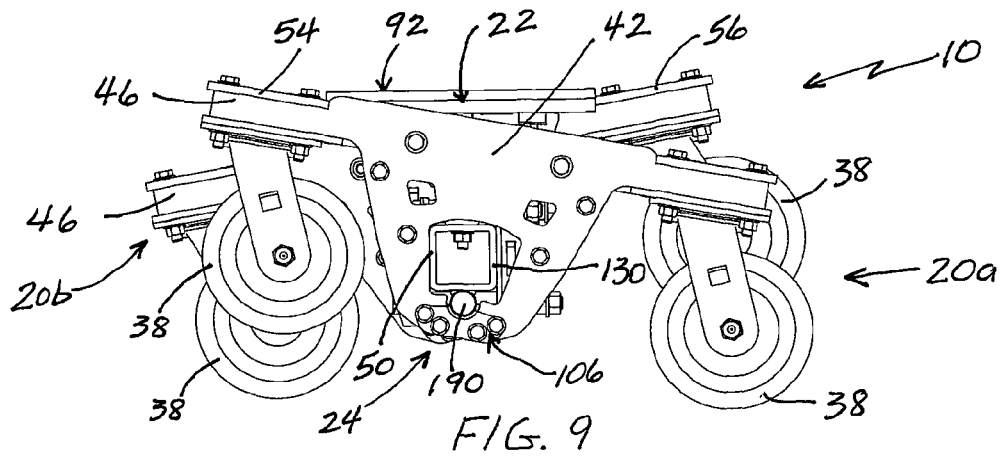
FIG. 9 is a side view of the wheel float of FIG. 8.
Figure 10A:
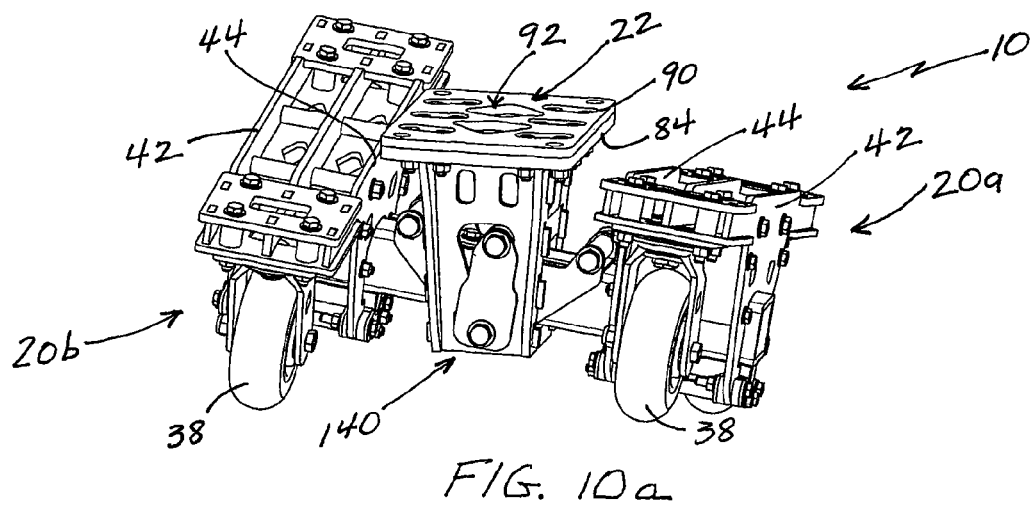
FIG. 10a is a front perspective view of the wheel float of FIG. 1 showing left/right side articulation of the crosstube assembly within the pedestal assembly and front/back articulation of the walking beam assemblies, with the walking beam assemblies being shown articulated in opposite directions.
Figure 10B:
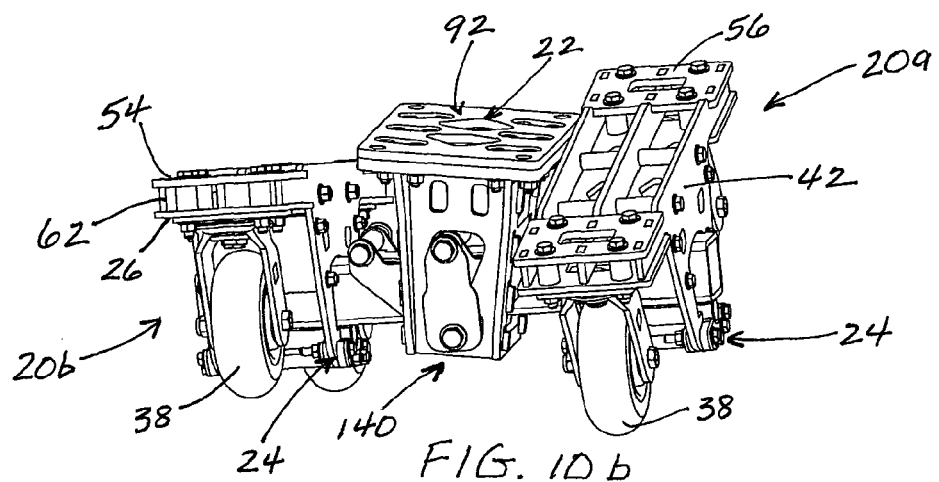
Figure 11:
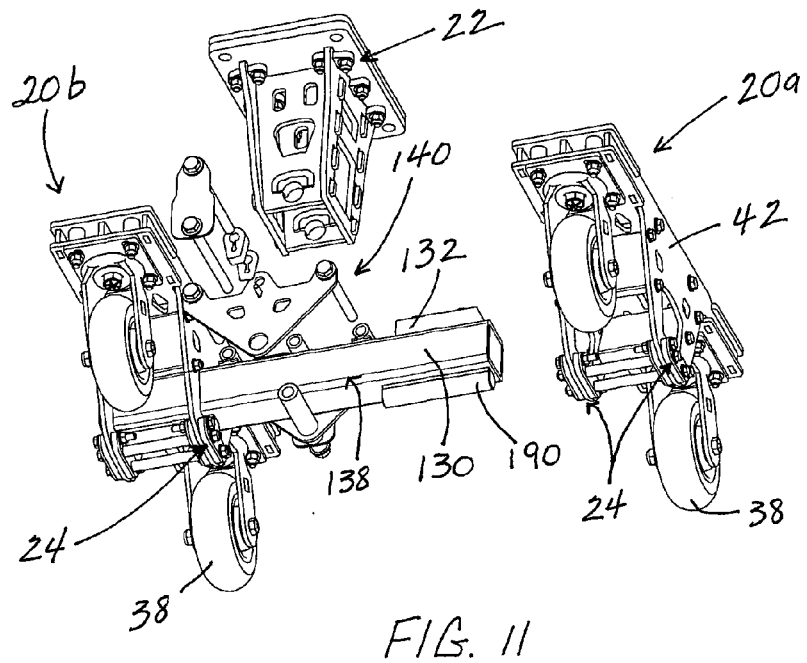
FIG. 11 is a partially exploded bottom perspective view of the wheel float of FIG. 1 showing the pedestal assembly projected upward, one of the walking beam assemblies projected sideways and a portion of the center pivot assembly disposed forwardly.

The wheel float 10 also comprises a center pivot assembly 140 that secures pedestal 22 to the crosstube 130 in a manner that allows the crosstube assembly 138 to pivot relative to the pedestal 22 (on which the object 12 is supported). As set forth above, the pivoting means 24 associated with each of the walking beam assemblies 20a/20b allows pivotal movement of the walking beam assemblies 20a/20b in a front-to-back direction, as shown in FIGS. 8 and 9. The center pivot assembly 140 allows each of the walking beam assemblies 20a/20b to pivot up and down in the left-to-right direction (looking from the end as in FIG. 6) in response to one or more of the wheels 38 contacting a non-planar area on the surface 14, as shown in FIGS. 6 and 7. Use the pivoting means 24 and the center pivot assembly 140 allows movement in both the front-to-back and left-to-right directions, as shown in FIGS. 10a and 10b.

Figure 14:
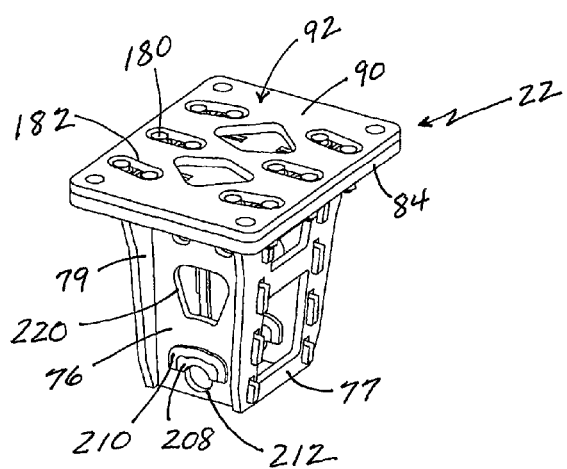
FIG. 14 is a top perspective view of the pedestal of the wheel float of FIG. 1.
Figure 15A:
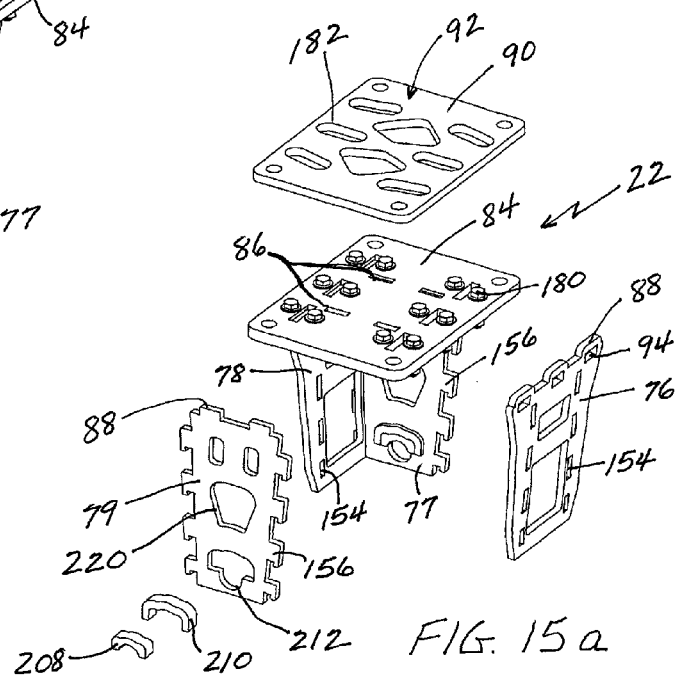
FIG. 15a is a partially exploded top perspective view of the pedestal of FIG. 14.
Figure 15B:
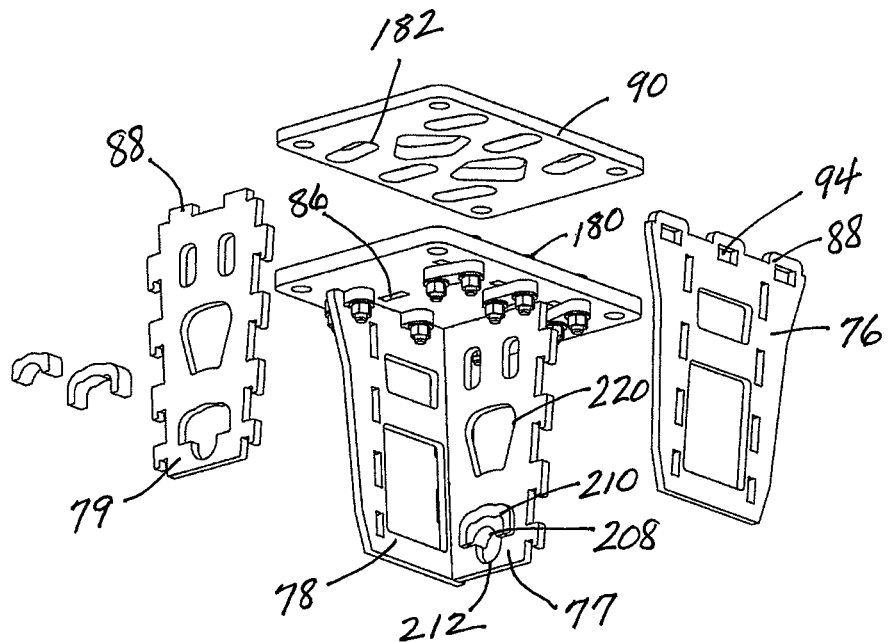
FIG. 15b is a partially exploded bottom perspective view of the pedestal of FIG. 14.
Figure 20:
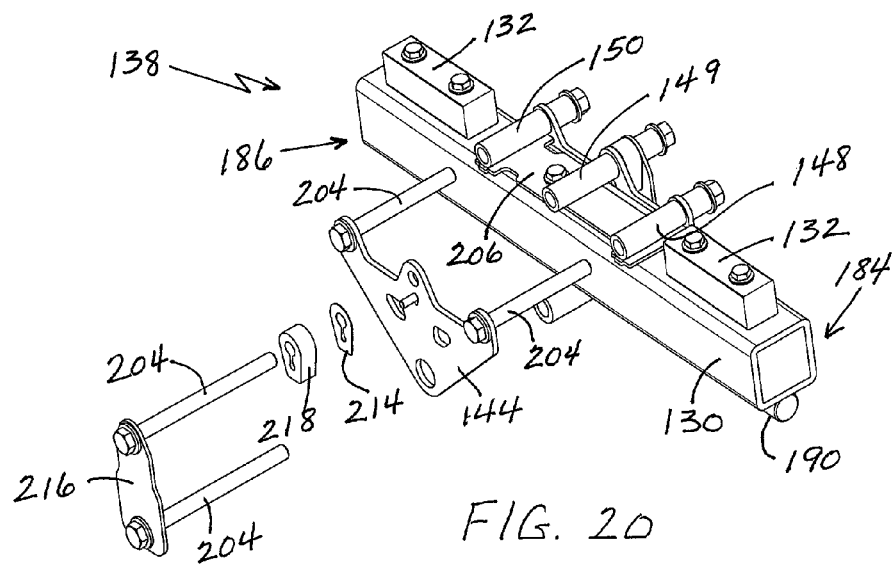
FIG. 20 is a front perspective view of the crosstube assembly and center pivot assembly of FIG. 16 showing the center pivot assembly partially exploded.
Figure 22:
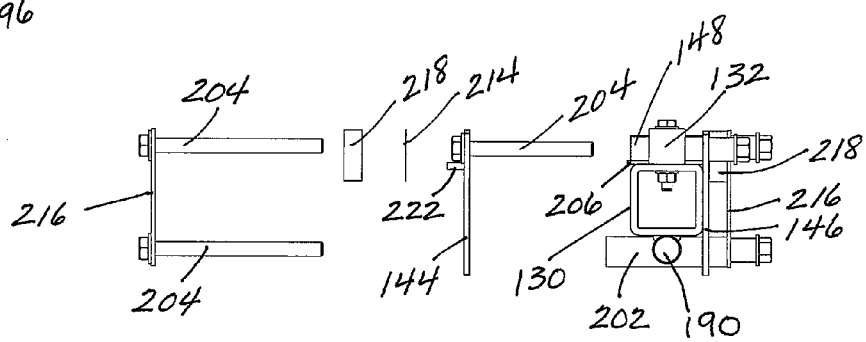
FIG. 22 is a right side view of the cross tube assembly and center pivot assembly of FIG. 20.
Figure 23:
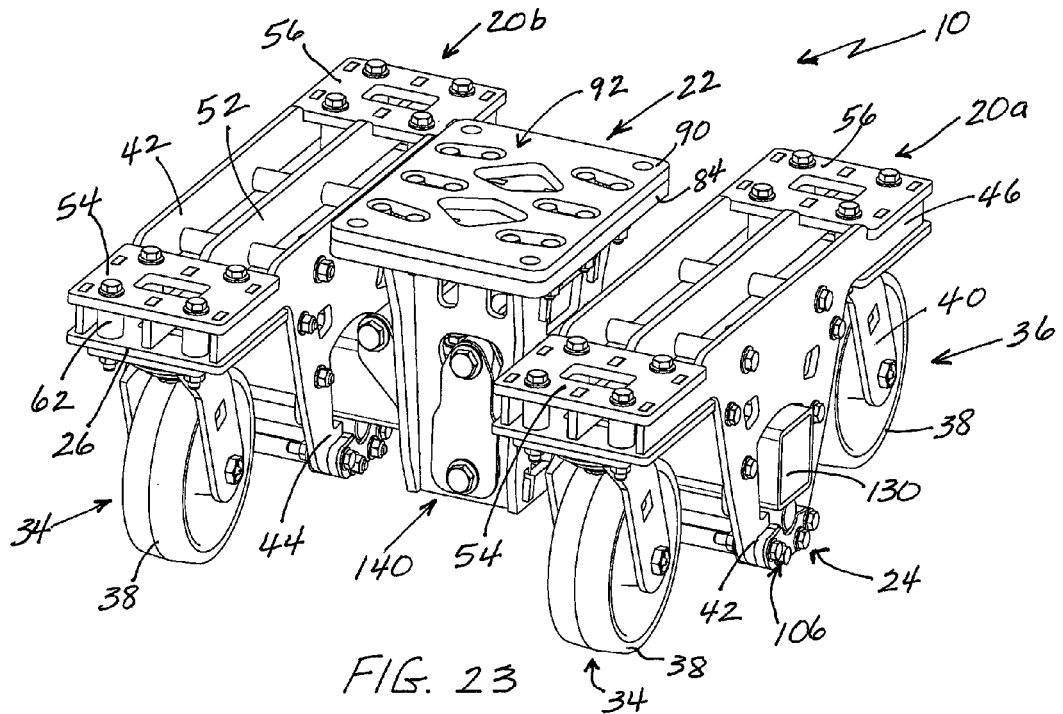
FIG. 23 is a top perspective view of a wheel float configured according to the principles and concepts of a second embodiment of the present invention showing the pedestal assembly disposed on an alternatively configured crosstube assembly interconnecting the pair of spaced apart walking beam assemblies.
Figure 24:
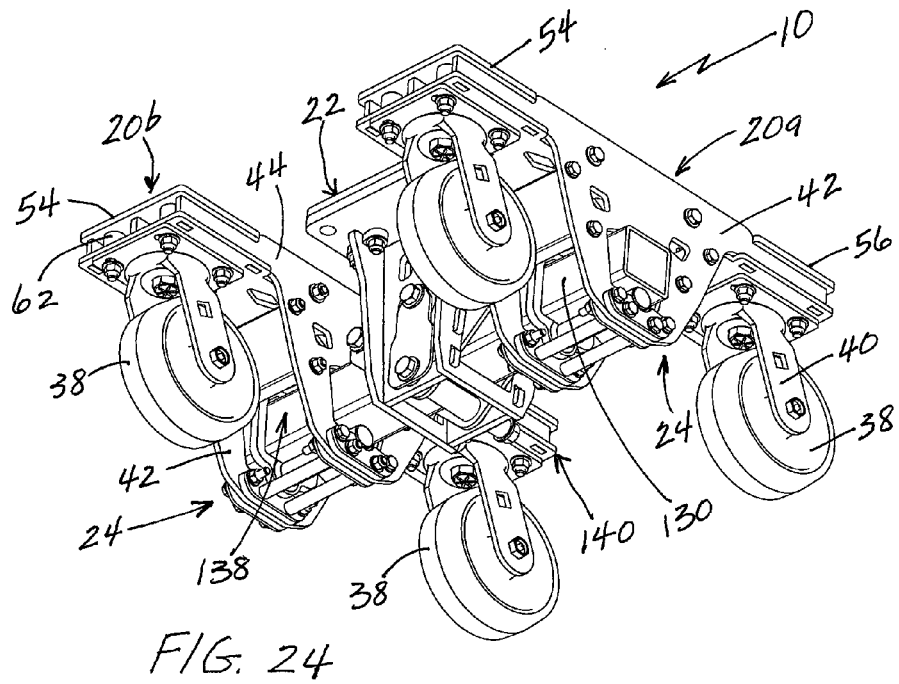
FIG. 24 is a bottom perspective view of the wheel float of FIG. 23.
Figure 25:
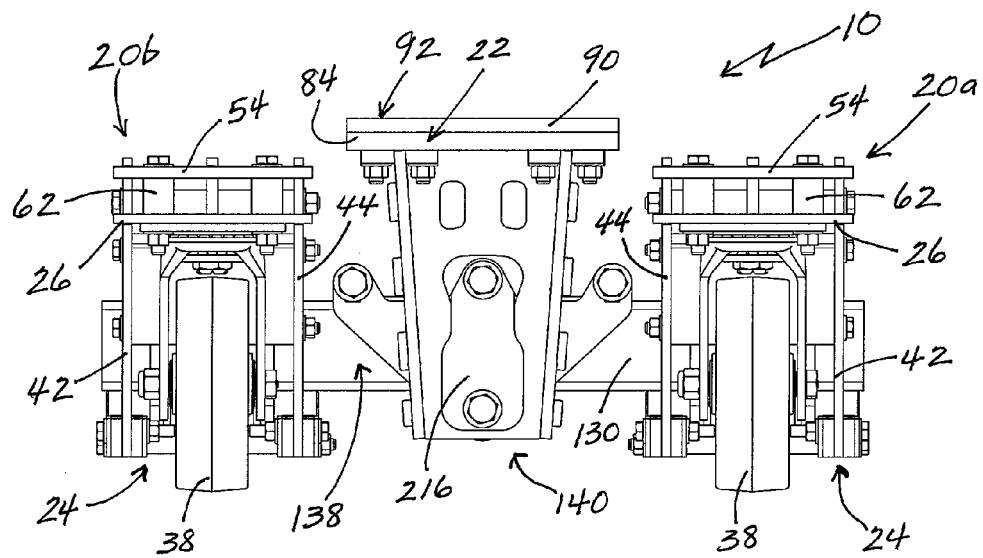
FIG. 25 is a front or leading view of the wheel float of FIG. 23.
Figure 26:
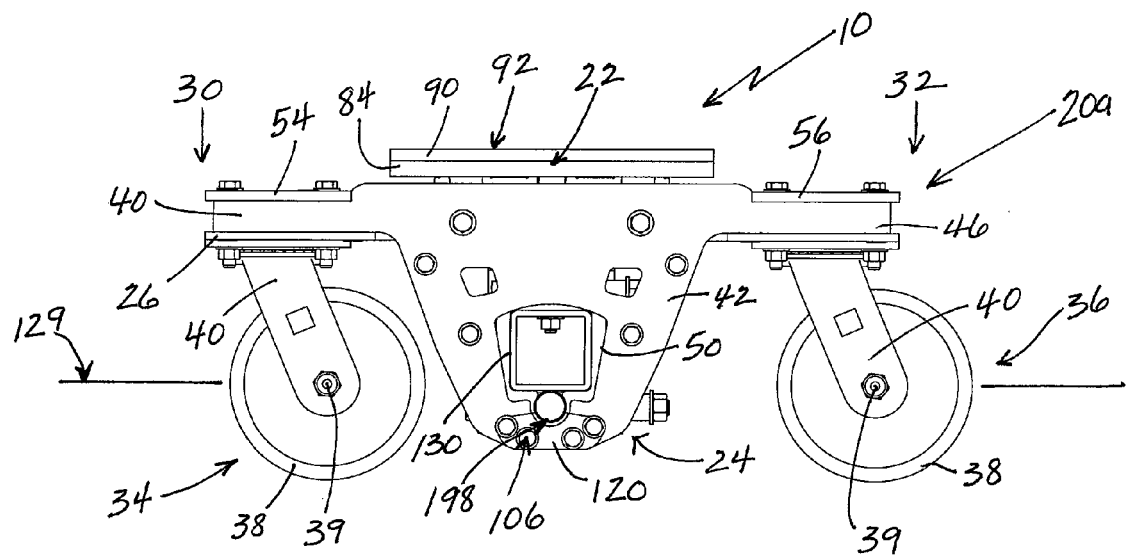
FIG. 26 is a right side view of the wheel float of FIG. 23.
Figure 27:
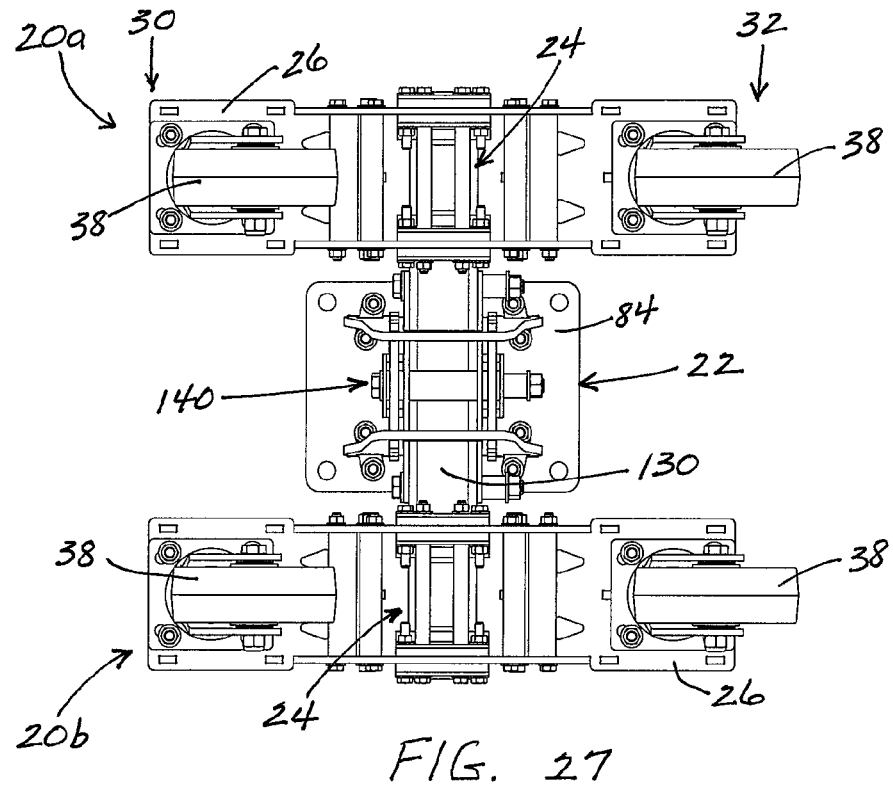
FIG. 27 is a bottom view of the wheel float of FIG. 23.
Figure 28:
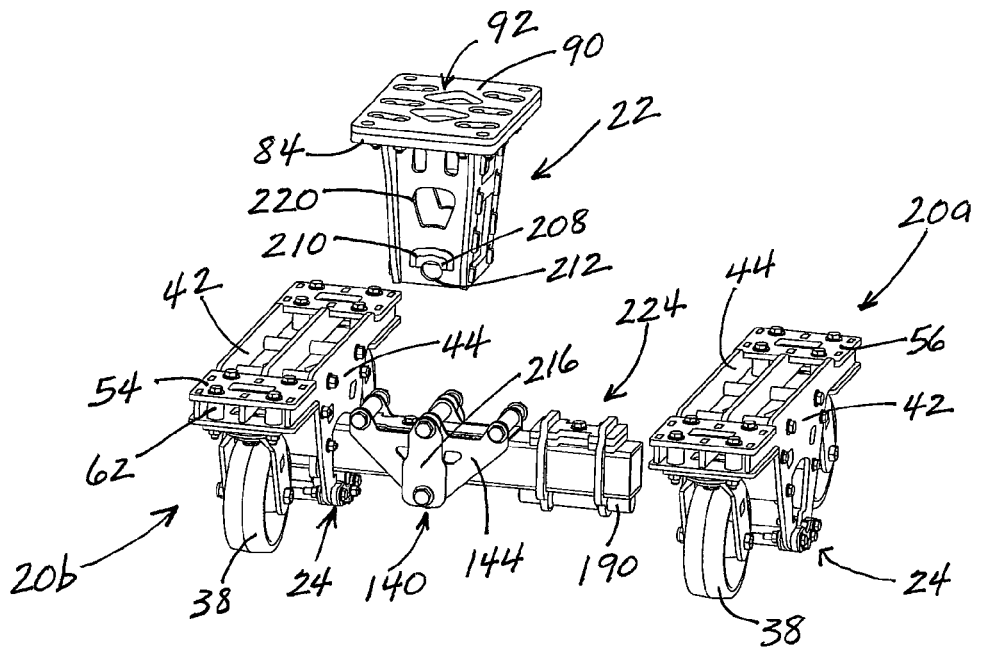
FIG. 28 is a partially exploded front perspective view of the wheel float of FIG. 23 showing the pedestal assembly projected upward and one of the walking beam assemblies projected sideways.
Figure 29:
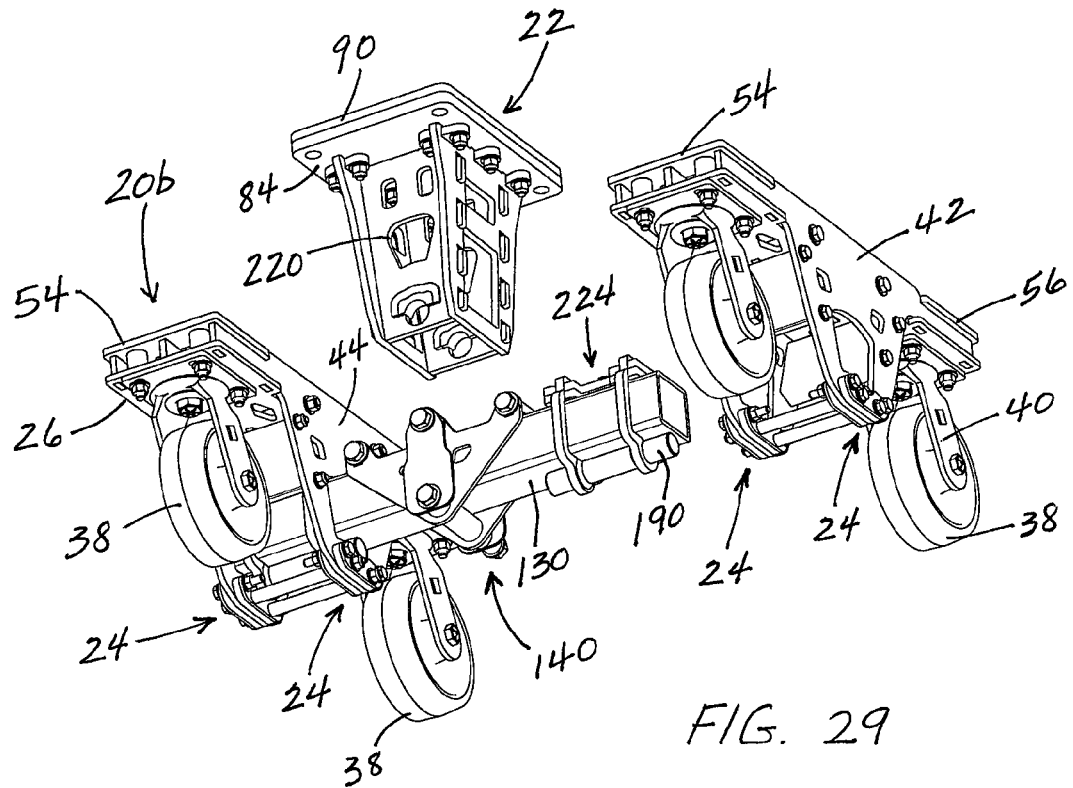
FIG. 29 is a bottom perspective view of the wheel float of FIG. 28; for the first walking beam assembly of the articulating carriage of FIG. 12.
Figure 30:
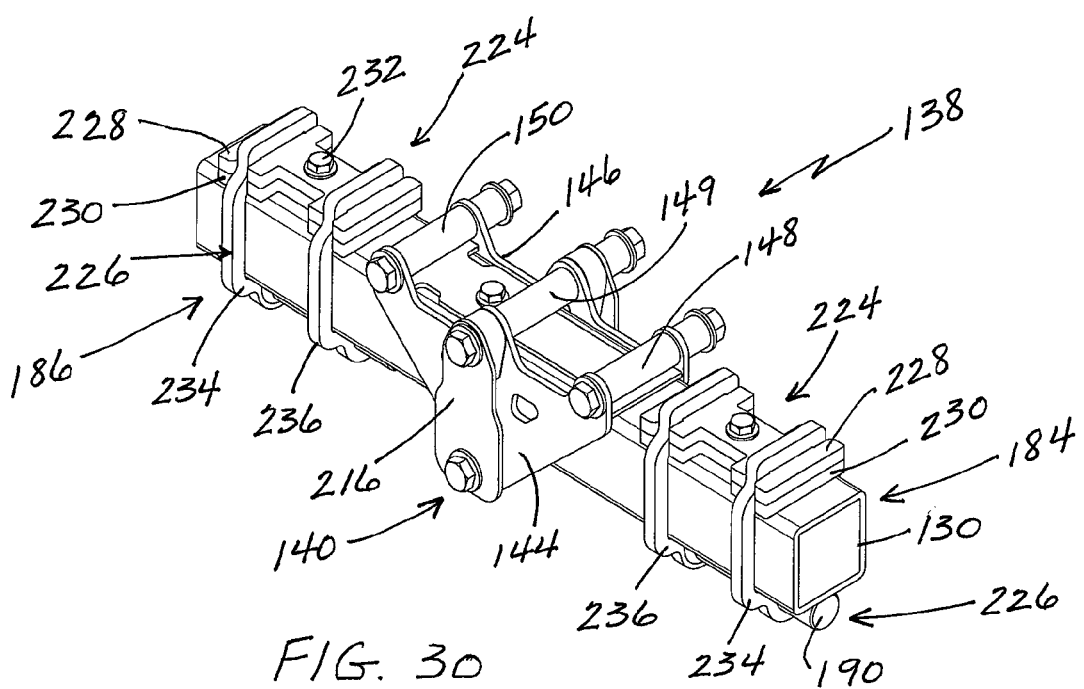
FIG. 30 is a top perspective view of the crosstube assembly and center pivot assembly of the wheel float of FIG. 23.
Figure 31:
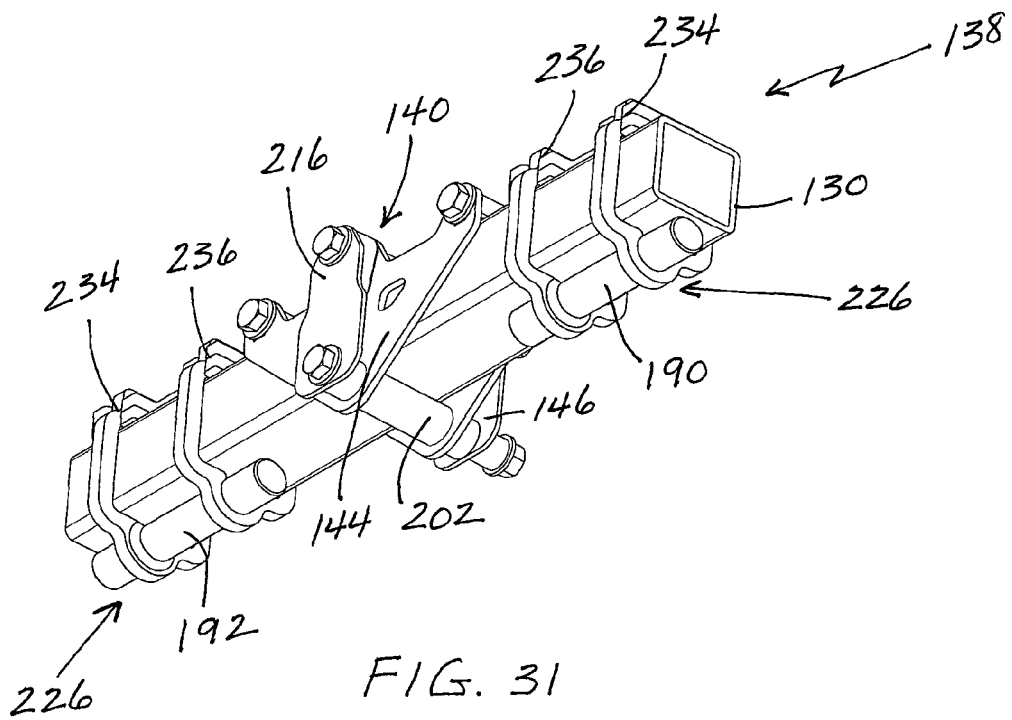
FIG. 31 is a bottom perspective view of the crosstube assembly and center pivot assembly of FIG. 30.
Figure 32:
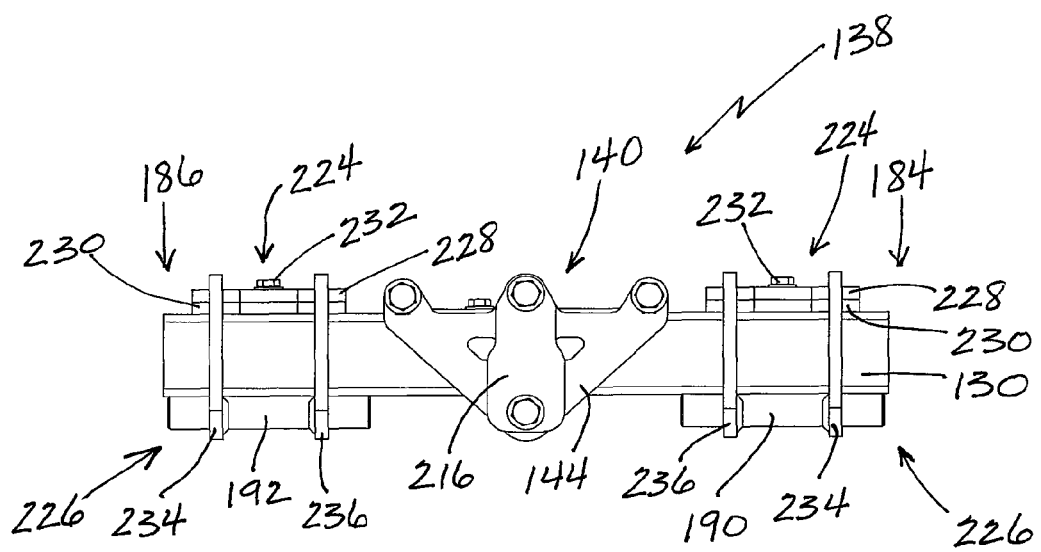
FIG. 32 is a front view of the crosstube assembly and center pivot assembly of FIG. 30.
Figure 33:
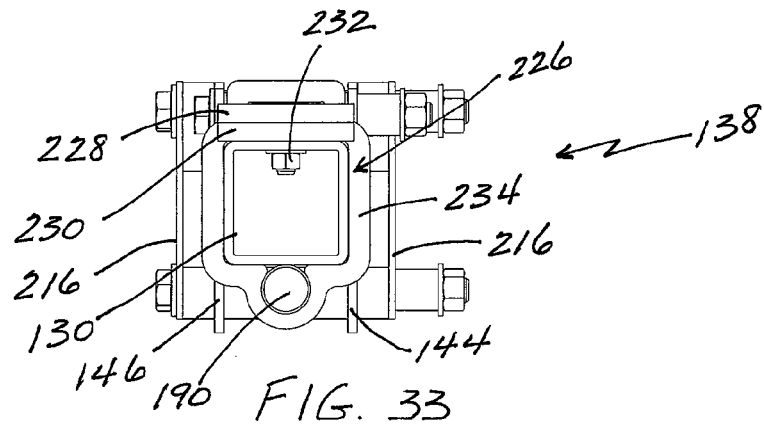
FIG. 33 is a right side view of the crosstube assembly and center pivot assembly of FIG. 30.
Figure 34:
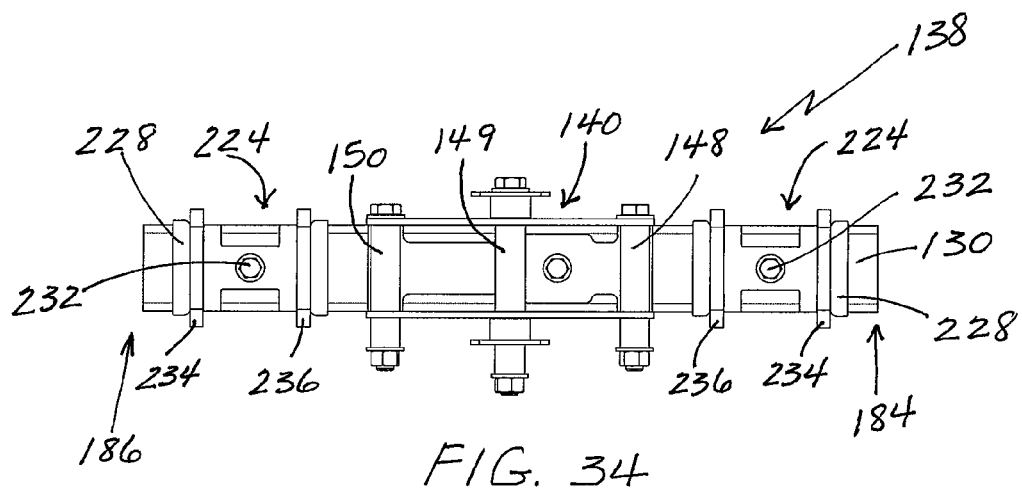
FIG. 34 is a top view of the crosstube assembly and center pivot assembly of FIG. 30.
Figure 35:
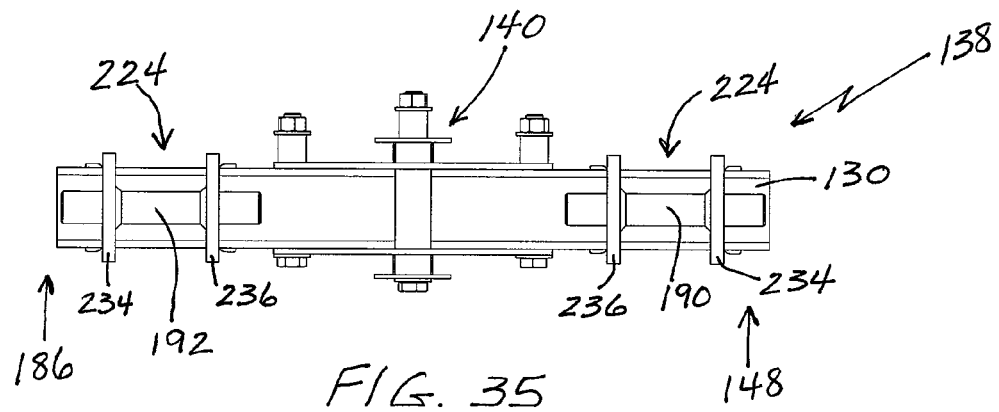
FIG. 35 is a bottom view of the crosstube assembly and center pivot assembly of FIG. 30.
Figure 36:
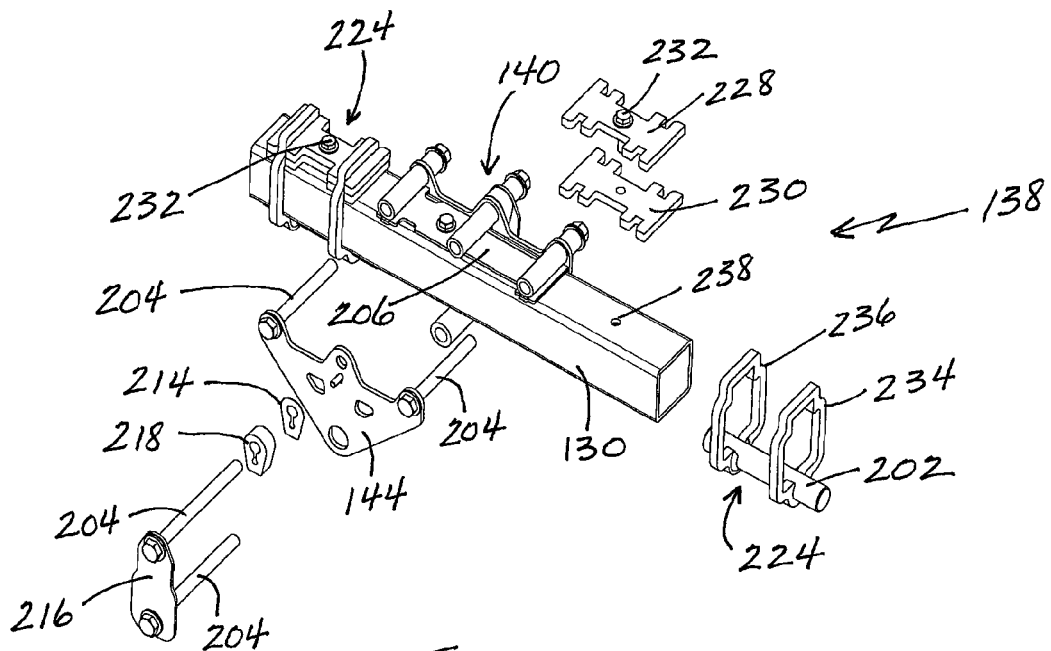
FIG. 36 is a front perspective view of the crosstube assembly and center pivot assembly of FIG. 30 showing the crosstube assembly and the center pivot assembly partially exploded.
Figure 37:
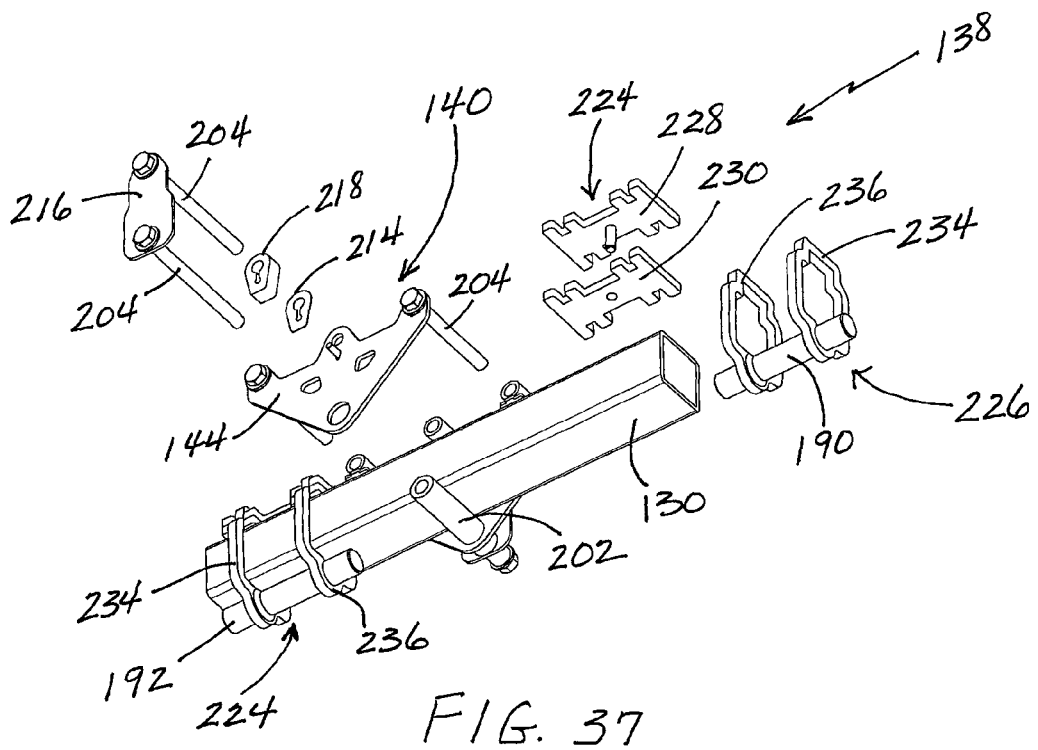
FIG. 37 is a bottom perspective view of the crosstube assembly and center pivot assembly of FIG. 36.

In the embodiment shown in the figures, the center pivot assembly 140, the components of which are best shown in FIGS. 16 through 22, comprises two yoke arm sets, identified as first yoke arm set 144 and second yoke arm set 146, that are positioned adjacent to spacer tubes 148, 149 and 150 located on the upper surface 200 of the crosstube 130 and to a pivot member, such as pivot tube 202, located on the lower surface 194 of the crosstube 130, as best shown in FIGS. 16-17 and 20-21. As shown in these figures, each of the spacer tubes 148/149/150 and the pivot tube 202, if utilized, are tubular members that are positioned transversely across crosstube 130 so each of these components may receive an elongated connecting element 204, such as the threaded bolts and nut combinations shown in FIG. 20, therethrough in a manner that secures the yoke arm sets 144/146 against the opposite sides of the crosstube 130 and, therefore, secures center pivot assembly 140 to crosstube assembly 138. When connected together, as best shown in FIGS. 16-19, the connecting elements 204 clamp the yoke arm sets 144/146 to the crosstube 130. The spacer tubes 148/149/150 and pivot tube 202 may be attached, such as by welding or the like, directly to the lower surface 194 of the crosstube 130. In the embodiment shown in the figures, the spacer tubes 148/149/150 are fixedly secured to a softener plate 206 that is bolted to the crosstube 130, as best shown in FIGS. 16 and 20. Although pivot member is shown as pivot tube 202, those skilled in the art will readily appreciate that the pivot member may be a rod, with or without its associated connecting element 204 attached to its end or ends and the pivot member, whether the pivot tube 202 or a rod, may or may not be welded in place below and against the lower surface 194 of crosstube 130. The pivot tube 202, or rod if utilized, is pivotally supported by a bushing 208 disposed in a bushing holder 210 located in the lower pivot apertures 212 of pedestal 22, as best shown in FIGS. 14, 15a and 15b. A shim 214 may be utilized, as best shown in FIGS. 20 and 21, to generate the necessary clearance between the bushing 208/bushing holder 210 and the yoke arm sets 144/146. The shim 214 may also be required to provide clearance if a link 216 is utilized to secure the pivot tube 202, or a rod, if the pivot member is not welded to crosstube 130. As best shown in FIGS. 20-22, a bridge member 218 is utilized with connecting element 204 which passes through the center spacer tube 149. During use of wheel float 10, the bridge member 218 abuts against the sides of the upper pivot aperture 220, best shown in FIGS. 14, 15a and 15b, in the pedestal 22 during the side-to-side articulation, as shown in FIGS. 6, 10a and 10b, that results when a non-planar area 16 is encountered in surface 14 as the object 12 is being moved. A dowel 222, extending outwardly from the face of the yoke arm sets 144/146 as shown in FIGS. 20-22, can be utilized in order to maintain a more positive orientation of the shim 214 and bridge member 218 around the connecting element 204 that passes through them and into the center spacer tube 149.

Use of the center pivot assembly 140, configured as described above with the yoke arm sets 144/146, results in a pivot point that is below the crosstube 130. This low pivot point provides a more desirable lower driving moment. In addition, the center pivot assembly 140 is utilized to spread the weight of the object 12 over a greater area of the crosstube 130. Use of the pivot tube 202, or other pivot member, and the bushing 208 in the lower pivot aperture 212 of pedestal 22 allows the crosstube assembly 138 to pivot up and down in the right-to-left direction relative to the pedestal 22 in response to one or more of the wheels 38 contacting a non-planar area 16 while moving across surface 14. The configuration described above and shown in the figures provides a simplified pivoting mechanism for crosstube assembly 138 that is virtually maintenance free and impervious to rust, dirt, ice and temperature.

If desired, the center pivot assembly 140 of the wheel float 10 of the present invention can be configured with the fulcrum components described and shown in the '593 application. The various fulcrum components are positioned in approximately the same location as the center pivot assembly 140 described and shown herein.

A second embodiment of the wheel float 10 of the present invention is shown in FIGS. 23 through 37. As shown in these figures, the most of the components of this embodiment are the same and function the same as for the embodiment described above and shown in FIGS. 1 through 22. The difference with this embodiment is the utilization of a positioning assembly 224 on the crosstube assembly 138, as best shown in FIGS. 28 through 37. The positioning assembly 224 comprises a pivot rod weldment 226 that secures pivot members 190/192 in place at or near the ends 184/186 of the crosstube assembly 138, one or more locating plates, such as first locating plate 228 and second locating plate 230, and a securing device 232 that secures the positioning assembly 224 to the crosstube 130. In this embodiment, the pivot rod weldment 226 comprises the pivot rod member 190/192 (as applicable depending on which end 184/186 of the crosstube assembly 138 the positioning assembly 224 is utilized) and a pair of rod support hangers, namely first rod support hanger 234 and second rod support hanger 236. These components are joined together to form a single unit that engage and hold in place the locating plates 228/230. The locating plates 228/230 function substantially the same as the thrust blocks 132. When the wheel float 10 is assembled, the locating plates 228/230 are positioned between the hangers 42/44 of each of the walking beam assemblies 20a/20b when the walking beam assemblies 20a/20b are assembled onto the crosstube assembly 138, as shown in FIGS. 23 through 27. Through use of the securing device 232, which pass through the locating plates 228/230, the locating plates 228/230 also position the pivot rod weldment 226, which thereby place pivot members 190/192 in their proper position with regard to the walking beam assemblies 20a/20b. In one embodiment, the securing device 232 is a bolt that is threadably received in a securing aperture 238, shown in FIG. 36, on the upper surface 200 of crosstube 130 so as to secure the locating plates 228/230 and, therefore, the pivot rod weldment 226 in its proper location. In an alternative configuration of this embodiment, the pivot rod weldment 226 can comprise a tubular section that interconnects the two rod support hangers 234/236 below the lower surface 194 of the crosstube 130 that is sized and configured to receive the appropriate pivot member 190/192, depending on which end 184/186 of the crosstube assembly 138 it is being utilized.

As stated above, one of the benefits of the wheel float 10 of the present invention is that no machining, welding, bending or fitting of parts is needed to assemble wheel float 10. Instead, all parts are made out of common material, such as steel (except the bushing 116) that is laser cut, chopped and/or drilled to the desired shape and configuration. The wheel float 10 can be shipped to the user disassembled and they can put the various parts together using bolts and without the use of highly skilled labor. For instance, as with the other components of wheel float 10 of the present invention, pedestal 22 is configured to be put together with only the use of bolts and without the need for highly skilled labor. As best shown in FIG. 22, the preferred pedestal 22 comprises a pair of first support plates 76/78 and a pair of second support plates 77/79 that are configured for interlocking engagement. The first support plates 76/78 have a plurality of tab receiving openings 154 that are each sized and configured to receive one of the hooked tabs 156 on second support plates 77/79. The bolt slots 94 on each of the first support plates 76/78 are utilized to connect the mounting plate 84 to the first support plates 76/78, with the spacer plate 90 in a "floating" relationship above the mounting plate 84 such that it is clamped between the mounting plate 84 and the support base 18 with the bolts that secure the support base 18 to wheel float 10. The interlocking configuration prevents the pedestal 22 from coming apart due to the weight of object 12 being supported and moved by wheel float 10.

As set forth above, the wheel float 10 of the present invention is very versatile with regard to the configuration that may be necessary to move very large and heavy objects 12. Because the wheel float 10 does not require any machining, welding, bending or other fitting of parts the user can easily and inexpensively put together the wheel float 10 using only bolts and without the need for highly skilled labor. The components can be made out of steel and laser cut or drilled to the desired size and configuration. Wheel float 10 is configured such that the center of the wheels 38 remain between the outer facing sides of the hangers 42/44 at all times. This keeps the wheel float 10 from shifting as it takes up play and makes it stronger, smoother and quieter. The use of the two walking beam assemblies 20a and 20b provides improved side directional performance, improved floatation of pedestal 22 and increased load carrying capacity for wheel float 10. The crosstube 130 in this embodiment is configured and has a length necessary to obtain the desired spacing between the first 20a and second 20b walking beam assemblies. The wheel float 10 has a low driving moment that directs inertial forces up and over non-planar areas 16. This greatly reduces mobile resistance compared to conventional casters that direct inertial forces down and into the obstacle, which results in an undesirable increase in resistance to movement. Wheel float 10 can be fitted with a braking mechanism, such as one that engages surface 14, to prevent movement of wheel float 10.

Although there is shown and described herein a specific form of the invention, it will be readily apparent to individuals skilled in the art that the present invention is not so limited, but is susceptible to numerous modifications and rearrangements in design and materials without departing from the spirit and scope of the invention. In particular, it should be noted that the present invention is subject to modification with regard to any dimensional relationships set forth herein and modifications in assembly, materials, size, shape, and use. For instance, there are numerous components described herein that can be replaced with equivalent functioning components to accomplish the objectives of the present invention.

What is claimed is:

1. A wheel float for moving an object across a surface, said wheel float comprising:

a first walking beam assembly having a base plate, a pair of wheels disposed below said base plate, a first hanger supported by said base plate and a second hanger supported by said base plate in spaced apart relation to said first hanger, each of said wheels configured to rotate about a wheel center and rotatably engage said surface and support said base plate above said surface, each of said first hanger and said second hanger having an articulation opening therein that are disposed in corresponding relation to each other below said base plate, each of said articulation openings having a bushing assembly disposed at a lower edge thereof;

a second walking beam assembly in spaced apart relation to said first walking beam assembly, said second walking beam assembly having a base plate, a pair of wheels disposed below said base plate, a first hanger supported by said base plate and a second hanger supported by said base plate in spaced apart relation to said first hanger, each of said wheels configured to rotate about a wheel center and rotatably engage said surface and support said base plate above said surface, each of said first hanger and said second hanger having an articulation opening therein that are disposed in corresponding relation to each other below said base plate, each of said articulation openings having a bushing assembly disposed at a lower edge thereof;

a crosstube assembly having an elongated crosstube, said crosstube assembly connecting each of said articulation openings of said first walking beam assembly with each of said articulation openings of said second walking beam assembly so as to connect said first walking beam assembly to said second walking beam assembly;

a first pivot member at or near a first end of said crosstube assembly, said first pivot member defining a pivot engaging surface engaging each of said bushing assemblies of said first walking beam assembly so as to define a pivot point and allow articulation of said first walking beam assembly relative to said crosstube when one of said wheels of said first walking beam assembly contacts a non-planar area on said surface, said pivot point disposed below a horizontal plane through said wheel center of each of said wheels of said first walking beam assembly when said wheel float moves across the surface and said surface is substantially planar;

a second pivot member at or near a second end of said crosstube assembly, said second pivot member defining a pivot engaging surface engaging each of said bushing assemblies of said second walking beam assembly so as to define a pivot point and allow articulation of said second walking beam assembly relative to said crosstube when one of said wheels of said second walking beam assembly contacts the non-planar area on said surface, said pivot point disposed below a horizontal plane through said wheel center of each of said wheels of said second walking beam assembly when said wheel float moves across the surface and said surface is substantially planar;

a pedestal supported by said crosstube between said first walking beam assembly and said second walking beam assembly, said pedestal having a mounting plate adapted to dispose a support surface above said base plate of each of said first walking beam assembly and said second walking beam assembly so as to support said object above said walking beam assemblies; and a center pivot assembly interconnecting said crosstube and said pedestal for pivoting said crosstube relative to said pedestal when at least one of said wheels of said first walking beam assembly and said second walking beam assembly contacts the non-planar area on said surface.

2. The wheel float of claim 1, wherein each of said first pivot member and said second pivot member are positioned in abutting relation to a lower surface of said crosstube.

3. The wheel float of claim 2, wherein each of said first pivot member and said second pivot member are fixedly attached to said lower surface of said crosstube.

4. The wheel float of claim 1 further, wherein said first pivot member is held in place by a positioning assembly generally disposed at or near said first end of said crosstube assembly and said second pivot member is held in place by a positioning assembly generally disposed at or near said second end of said crosstube assembly.

5. The wheel float of claim 4, wherein said positioning assembly at said first end of said crosstube assembly comprises a pivot rod weldment incorporating said first pivot member therein and said positioning assembly at said second end of said crosstube assembly comprises a pivot rod weldment incorporating said second pivot member therein.

6. The wheel float of claim 5, wherein each of said pivot rod weldments comprise a first rod support hanger and a second rod support hanger, said second rod support hanger disposed in spaced apart relation to said first rod support hanger.

7. The wheel float of claim 6, wherein each of said positioning assemblies further comprise one or more locating plates positioned on an upper surface of said crosstube at each of said first end and said second end of said crosstube assembly, said locating plates in engaging relation with each of said first rod support hanger and said second rod support hanger, said locating plates positioned and configured to properly position said first walking beam assembly and said second walking beam assembly on said crosstube assembly.

8. The wheel float of claim 5, wherein each of said positioning assemblies further comprise one or more locating plates positioned on an upper surface of said crosstube at each of said first end and said second end of said crosstube assembly so as to properly position said first walking beam assembly and said second walking beam assembly on said crosstube assembly.

9. The wheel float of claim 1, wherein said center pivot assembly comprises a forwardly disposed first yoke arm set in abutting relation to said crosstube, a rearwardly disposed second yoke arm set in abutting relation to said crosstube and in opposing relation to said first yoke arm set, one or more spacer tubes positioned against an upper surface of said crosstube so as to substantially interconnect said first yoke arm set and said second yoke arm set and a pivot tube disposed against a lower surface of said crosstube, said pivot tube disposed in pivoting relation to a bushing associated with said pedestal so as to allow said crosstube assembly to pivot relative to said pedestal.

10. The wheel float of claim 9, wherein said first yoke arm set, said second yoke arm set, said spacer tubes and said pivot tube are configured to clamp said center pivot assembly against said crosstube.

11. The wheel float of claim 9, wherein said pedestal comprises a pair of opposing support plates and said bushing is disposed in a lower pivot aperture in each of said pair of opposing support plates.

12. The wheel float of claim 1, wherein each of said first walking beam assembly and said second walking beam assembly has a pivot limiting means separately associated therewith for separately limiting pivotal movement of said first walking beam assembly and said second walking beam assembly, said pivot limiting means comprising a forward edge and a rearward edge of each of said articulation openings of said hangers of said walking beam assemblies.

13. A wheel float for moving an object across a surface, said wheel float comprising:

a first walking beam assembly having a base plate, a pair of wheels disposed below said base plate, a first hanger supported by said base plate and a second hanger supported by said base plate in spaced apart relation to said first hanger, each of said wheels configured to rotate about a wheel center and rotatably engage said surface and support said base plate above said surface, each of said first hanger and said second hanger having an articulation opening therein that are disposed in corresponding relation to each other below said base plate, each of said articulation openings having a bushing assembly disposed at a lower edge thereof;

a second walking beam assembly in spaced apart relation to said first walking beam assembly, said second walking beam assembly having a base plate, a pair of wheels disposed below said base plate, a first hanger supported by said base plate and a second hanger supported by said base plate in spaced apart relation to said first hanger, each of said wheels configured to rotate about a wheel center and rotatably engage said surface and support said base plate above said surface, each of said first hanger and said second hanger having an articulation opening therein that are disposed in corresponding relation to each other below said base plate, each of said articulation openings having a bushing assembly disposed at a lower edge thereof;

a crosstube assembly having an elongated crosstube, said crosstube assembly connecting each of said articulation openings of said first walking beam assembly with each of said articulation openings of said second walking beam assembly so as to connect said first walking beam assembly to said second walking beam assembly;

a first pivot member at or near a first end of said crosstube assembly, said first pivot member defining a pivot engaging surface engaging each of said bushing assemblies of said first walking beam assembly so as to define a pivot point and allow articulation of said first walking beam assembly relative to said crosstube when one of said wheels of said first walking beam assembly contacts a non-planar area on said surface, said pivot point disposed below a horizontal plane through said wheel center of each of said wheels of said first walking beam assembly when said wheel float moves across the surface and said surface is substantially planar;

a second pivot member at or near a second end of said crosstube assembly, said second pivot member defining a pivot engaging surface engaging each of said bushing assemblies of said second walking beam assembly so as to define a pivot point and allow articulation of said second walking beam assembly relative to said crosstube when one of said wheels of said second walking beam assembly contacts the non-planar area on said surface, said pivot point disposed below a horizontal plane through said wheel center of each of said wheels of said second walking beam assembly when said wheel float moves across the surface and said surface is substantially planar;

a pedestal supported by said crosstube between said first walking beam assembly and said second walking beam assembly, said pedestal having a pair of opposing support plates, a mounting plate connected to said support plates and a bushing disposed in a lower pivot aperture of each of said pair of opposing support plates, said mounting plate adapted to dispose a support surface above said base plate of each of said first walking beam assembly and said second walking beam assembly so as to support said object above said walking beam assemblies; and a center pivot assembly interconnecting said crosstube and said pedestal, said center pivot assembly having a forwardly disposed first yoke arm set in abutting relation to said crosstube, a rearwardly disposed second yoke arm set in abutting relation to said crosstube and in opposing relation to said first yoke arm set, one or more spacer tubes positioned against an upper surface of said crosstube so as to substantially interconnect said first yoke arm set and said second yoke arm set and a pivot tube disposed against a lower surface of said crosstube, said pivot tube disposed in pivoting relation to each of said bushings of said pedestal so as to allow said crosstube assembly to pivot relative to said pedestal when at least one of said wheels of said first walking beam assembly and said second walking beam assembly contacts the non-planar area on said surface.

14. The wheel float of claim 13 further, wherein said first pivot member is held in place by a positioning assembly generally disposed at or near said first end of said crosstube assembly and said second pivot member is held in place by a positioning assembly generally disposed at or near said second end of said crosstube assembly.

15. The wheel float of claim 14, wherein said positioning assembly at said first end of said crosstube assembly comprises a pivot rod weldment incorporating said first pivot member therein and said positioning assembly at said second end of said crosstube assembly comprises a pivot rod weldment incorporating said second pivot member therein.

16. The wheel float of claim 15, wherein each of said pivot rod weldments comprise a first rod support hanger and a second rod support hanger, said second rod support hanger disposed in spaced apart relation to said first rod support hanger.

17. The wheel float of claim 16, wherein each of said positioning assemblies further comprise one or more locating plates positioned on an upper surface of said crosstube at each of said first end and said second end of said crosstube assembly, said locating plates in engaging relation with each of said first rod support hanger and said second rod support hanger, said locating plates positioned and configured to properly position said first walking beam assembly and said second walking beam assembly on said crosstube assembly.

18. The wheel float of claim 17, wherein each of said positioning assemblies further comprise one or more locating plates positioned on an upper surface of said crosstube at each of said first end and said second end of said crosstube assembly so as to properly position said first walking beam assembly and said second walking beam assembly on said crosstube assembly.

19. A wheel float for moving an object across a surface, said wheel float comprising:

a first walking beam assembly having a base plate, a first caster assembly at a first end of said first walking beam assembly, a second caster assembly at a second end of said first walking beam assembly, a first hanger supported by said base plate and a second hanger supported by said base plate in spaced apart relation to said first hanger, each of said first caster assembly and said second caster assembly having a wheel configured to rotate about a wheel center and rotatably engage said surface and support said base plate above said surface, said wheel center disposed between said first hanger and said second hanger, each of said first hanger and said second hanger having an articulation opening therein that are disposed in corresponding relation to each other below said base plate, each of said articulation openings having a bushing assembly disposed at a lower edge thereof;

a second walking beam assembly in spaced apart relation to said first walking beam assembly, said second walking beam assembly having a base plate, a first caster assembly at a first end of said second walking beam assembly, a second caster assembly at a second end of said second walking beam assembly, a first hanger supported by said base plate and a second hanger supported by said base plate in spaced apart relation to said first hanger, each of said first caster assembly and said second caster assembly having a wheel configured to rotate about a wheel center and rotatably engage said surface and support said base plate above said surface, each of said wheel centers of said wheels disposed between said first hanger and said second hanger, each of said first hanger and said second hanger having an articulation opening therein that are disposed in corresponding relation to each other below said base plate, each of said articulation openings having a bushing assembly disposed at a lower edge thereof;

a crosstube assembly having an elongated crosstube, said crosstube assembly interconnecting each of said articulation openings of said first walking beam assembly and said articulation openings of each of said second walking beam assembly;

a first pivot member at or near a first end of said crosstube assembly, said first pivot member defining a pivot engaging surface engaging each of said bushing assemblies of said first walking beam assembly to define a pivot point and allow articulation of said first walking beam assembly relative to said crosstube when one of said wheels of said first walking beam assembly contacts a non-planar area on said surface, said pivot point disposed below a horizontal plane through said wheel center of each of said wheels of said first walking beam assembly when said wheel float moves across the surface and said surface is substantially planar;

a second pivot member at or near a second end of said crosstube assembly, said second pivot member defining a pivot engaging surface engaging each of said bushing assemblies of said second walking beam assembly to define a pivot point and allow articulation of said second walking beam assembly relative to said crosstube when one of said wheels of said second walking beam assembly contacts a non-planar area on said surface, said pivot point disposed below a horizontal plane through said wheel center of each of said wheels of said second walking beam assembly when said wheel float moves across the surface and said surface is substantially planar;

a pedestal supported by said crosstube between said first walking beam assembly and said second walking beam assembly, said pedestal having a pair of spaced apart first support plates, a pair of spaced apart second support plates and a mounting plate interconnecting said support plates so as to dispose a support surface above said base plates of each of said first walking beam assembly and said second walking beam assembly so as to support said object above said walking beam assemblies; and a center pivot assembly interconnecting said crosstube and said pedestal for pivoting said crosstube relative to said pedestal when at least one of said wheels of said first walking beam assembly and said second walking beam assembly contacts said non-planar area on said surface to pivot said walking beam assembly relative to said pedestal.

20. The wheel float of claim 19, wherein said center pivot assembly comprises a forwardly disposed first yoke arm set in abutting relation to said crosstube, a rearwardly disposed second yoke arm set in abutting relation to said crosstube and in opposing relation to said first yoke arm set, one or more spacer tubes positioned against an upper surface of said crosstube so as to substantially interconnect said first yoke arm set and said second yoke arm set and a pivot tube disposed against a lower surface of said crosstube, said pivot tube disposed in pivoting relation to a bushing associated with said pedestal so as to allow said crosstube assembly to pivot relative to said pedestal.

* * * * *